(12) United States Patent
Xie et al.

(10) Patent No.: US 12,437,398 B2
(45) Date of Patent: Oct. 7, 2025

(54) SYSTEMS AND METHODS FOR SPECIMEN PROCESSING AND STORAGE

(71) Applicant: Georgia Tech Research Corporation, Atlanta, GA (US)

(72) Inventors: Xing Xie, Atlanta, GA (US); Wensi Chen, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 563 days.

(21) Appl. No.: 17/997,281

(22) PCT Filed: Apr. 29, 2021

(86) PCT No.: PCT/US2021/029837
§ 371 (c)(1),
(2) Date: Oct. 27, 2022

(87) PCT Pub. No.: WO2021/222531
PCT Pub. Date: Nov. 4, 2021

(65) Prior Publication Data
US 2023/0169650 A1    Jun. 1, 2023

Related U.S. Application Data

(60) Provisional application No. 63/017,185, filed on Apr. 29, 2020.

(51) Int. Cl.
*G06T 7/00* (2017.01)
*B01D 61/14* (2006.01)

(52) U.S. Cl.
CPC .......... *G06T 7/0012* (2013.01); *B01D 61/147* (2013.01); *G06T 2207/30004* (2013.01)

(58) Field of Classification Search
CPC ...... B01J 20/261; B01J 20/264; B01J 20/267; B01J 20/28011; B01J 20/28019;
(Continued)

(56) References Cited

U.S. PATENT DOCUMENTS 5,130,343 A   7/1992   Frechet et al.
7,612,016 B2  11/2009  Mertens et al.
(Continued)

OTHER PUBLICATIONS

International Search Report and Written Opinion from Application No. PCT/US2021/29837 dated Oct. 4, 2021.

*Primary Examiner* — Dirk R Bass
(74) *Attorney, Agent, or Firm* — Troutman Pepper Locke LLP; Ryan A. Schneider; Nicholas H. Doss

(57) ABSTRACT

A method including receiving a specimen comprising a carrier, a first target species, and a first component and storing at least a portion of the carrier and the first target species in a storage media by self-driven filtering of the specimen in the storage media, wherein the storage media comprises porous superabsorbent polymer (PSAP) beads. The PSAP beads provide for fast and self-driven microfiltration of biofluid samples. The treatment effectively separates small analytical targets (e.g., glucose, catalase, and bacteriophage) and large undesired components (e.g., bacteria and blood cells) in the biofluids by capturing the former inside and excluding the latter outside the PSAP beads. The treatment can reduce sample volume, self-aliquot the liquid sample, avoid microbial contamination, separate plasma from blood cells, stabilize target species inside the beads, and enable long-term storage at room temperature.

28 Claims, 29 Drawing Sheets

(58) Field of Classification Search
CPC ............ B01J 20/28059; B01J 20/28069; B01J 20/28085; B01J 2220/68; B01D 15/34; G01N 15/1433; G01N 2015/1006; G01N 5/025; G06T 2207/30004; G06T 7/0012
See application file for complete search history.

(56) References Cited

U.S. PATENT DOCUMENTS

| | | |
|---|---|---|
| 8,057,668 B2 | 11/2011 | Gjerde et al. |
| 9,273,308 B2 | 3/2016 | Link et al. |
| 9,714,444 B2 | 7/2017 | Yue et al. |
| 2010/0044316 A1 | 2/2010 | Childs et al. |

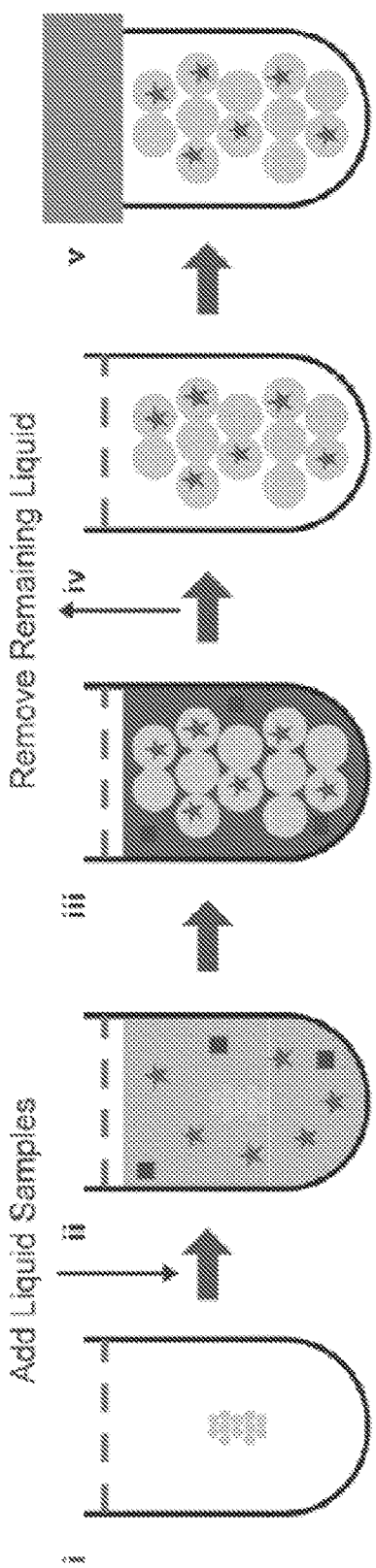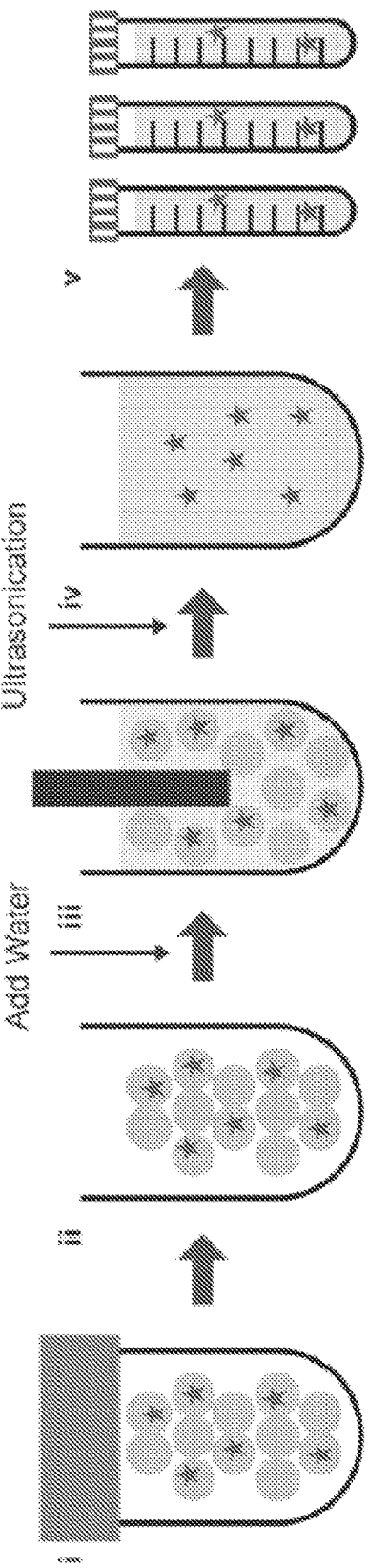
FIG. 8A
FIG. 8B

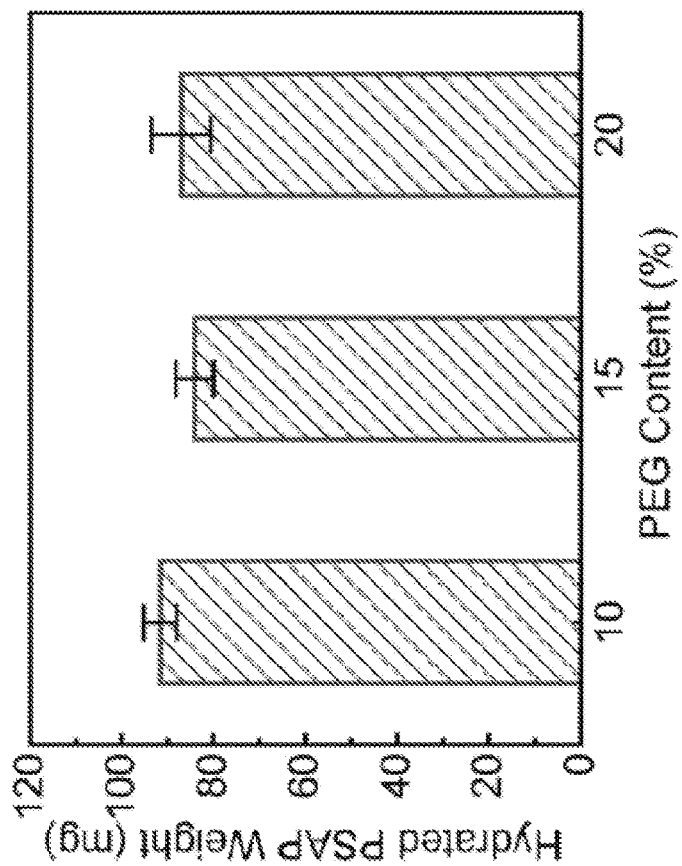
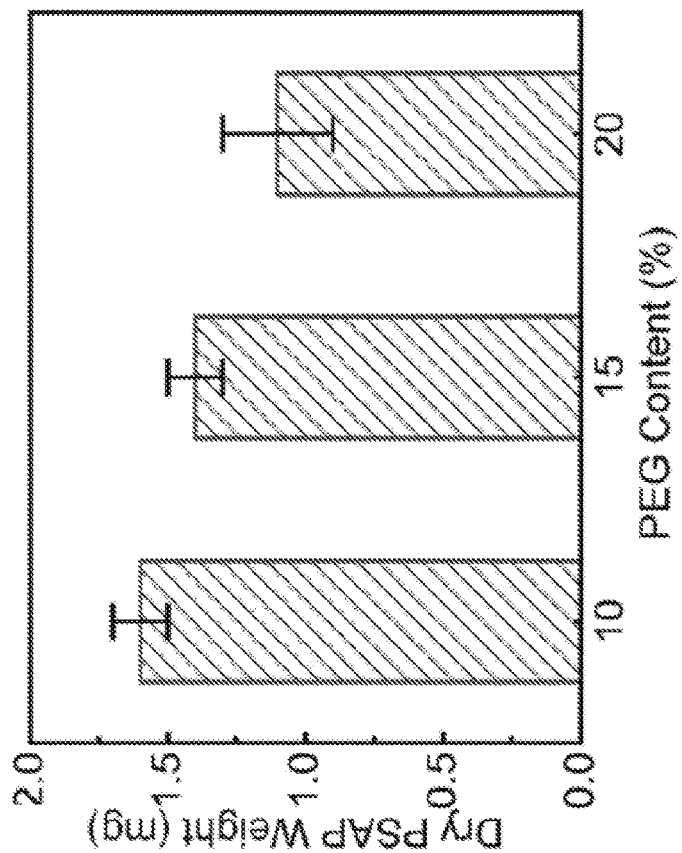
FIG. 15A
FIG. 15B

SYSTEMS AND METHODS FOR SPECIMEN PROCESSING AND STORAGE

CROSS-REFERENCE TO RELATED APPLICATIONS

This application claims benefit under 35 USC § 119(e) of U.S. Provisional Patent Application No. 63/017,185 filed 29 Apr. 2020, the entirety of which is incorporated herein by reference as if set forth herein in its entirety.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

The current disclosure generally relates to systems and methods for specimen processing and storage, and in particular to systems and methods using porous superabsorbent polymer (PSAP) beads that provide for fast and self-driven microfiltration of biofluid samples.

2. Description of Related Art

The challenge of disease diagnosis in rural areas and low-income countries remains huge. It is a common practice to ship biofluid specimens for off-site diagnostic tests in resource-limited areas. For example, during the global outbreak of the COVID-19 pandemic, an at-home collection kit was developed for point-of-use tests, the samples for which can be collected at home and sent to certified laboratories. Traditionally, biofluid specimens need to be refrigerated upon collection and processed in a short time (e.g., within the same day). The handling, storage, and transportation of biofluid specimens such as blood and urine without refrigeration are extremely challenging.

Hemolysis, the poor stability of molecular biomarkers (especially proteins), and the fast growth of contaminating bacteria at ambient temperatures significantly compromise the quality of the testing results generated. Hemolysis is one of the most common preanalytical sources of error for blood samples found in clinical laboratories, accounting for 40 to 70% of unsuitable samples identified. The release of intracellular analytes into plasma or serum in hemolyzed samples is known to cause bias in testing results (e.g., serum potassium, lactate dehydrogenase, and aspartate aminotransferase). Even if removing the blood cells, without temperature regulation, protein biomarkers in the separated plasma or serum samples degrade quickly, accounting for up to 67% of the laboratory contaminated by urethral flora, which can multiply rapidly to 104 colony-forming units (CFU)/mL within one day in freshly voided urine. Previous research has demonstrated the adverse effects of microbial contaminations on the urinary detection index (e.g., glucose, steroid, and microalbumin).

In general, refrigeration storage and transportation are not feasible both logistically and financially in resource-limiting settings. Thus, many biofluid samples may not be preserved appropriately before arriving at centralized laboratories, which hinders remote sample collection, disease screening, early diagnosis, and clinical intervention in underserved populations. Therefore, there is an urgent need for low-cost, effective, reliable, and easily applicable biofluid sample preservation technologies. Promising alternative non-refrigeration preservation methods have been enabled by various functional materials and novel approaches, including dried spot sampling, isothermal vitrification, lyophilization, and biomaterial encapsulation.

However, they still cannot entirely substitute the convectional method and are limited by one or more of (i) long sample treatment time, (ii) high cost, (iii) intensive instrument requirement, (iv) complex operation, and/or (v) inadequate protective capacity. For example, a silk matrix was applied to encapsulate and protect protein biomarkers in blood from thermally induced damage and achieved long-term IgE preservation (up to 84 days at 45° C.). Nevertheless, it took eight hours for the blood samples to air-dry in a sterile environment, and the silk material used was relatively expensive.

In addition, removing blood cells by centrifugation is usually required for long-term storage of blood-derived samples to avoid effects of hemolysis, but conventional centrifuges are bulky, expensive, and electrically powered, thus typically inaccessible in resource-limiting areas.

Some hand-powered and low-cost centrifuges have been developed for fast and effective separation of blood cells and plasma. For example, a paper centrifuge inspired by whirligig toys has been developed and achieved centrifugal forces of 30,000 g to separate plasma from blood samples within 1.5 minutes. Other alternative gadgets include a vegetable-dehydrator-like centrifuge, an egg-beater-based centrifuge, and a groove-based microfluidic device. However, these portable centrifuges usually require multiple-step operations and cannot effectively process a large volume of samples.

Thus, technological innovation is needed to provide systems and methods for remote collection of biofluid specimens such as blood and urine, which remains a great challenge due to the requirement of continuous refrigeration. Without proper temperature regulation, the rapid degradation of analytical targets/target species in the specimen may compromise the accuracy and reliability of the testing results.

It is an object of the present invention to provide a treatment that can reduce sample volume, self-aliquot the liquid sample, avoid microbial contamination, separate plasma from blood cells, stabilize target species inside the beads, and enable long-term storage at room temperature.

BRIEF SUMMARY OF THE INVENTION

Briefly described, according to exemplary embodiments of the present invention, a self-driven microfiltration treatment is enabled by porous superabsorbent polymer (PSAP) beads for biofluid specimen processing and storage. The synthesized PSAP bead has a well-controlled porous structure for selective absorption of target species in the biofluid, and an excellent swelling capacity to store the biofluid together with analytical targets inside the bead.

Different from the traditional filtration process where the filtrate passes through the filter due to a pressure difference, in the present self-driven microfiltration treatment the filtrate is retained in the PSAP beads. The present invention improves the preservation of biofluid samples without refrigeration.

The present rationally designed PSAP beads absorb liquid or semi-liquid samples (blood, urine, etc.) at the point of collection for easier aliquoting and transportation, and at the same time to stabilize analytical targets for longer shelf life, thus improving quality of results generated in the subsequent lab tests. PSAPs can absorb and retain large amounts of liquid up to 1000 times of their own weight. PSAP beads with desirable diameters (ranging from a few μm to a few mm) can be prepared using an inverse suspension polymerization method or a micro/milli-fluidic method. The absorption capacity of the beads and the components that can be captured by the beads are determined by the chemical composition of the PSAPs.

In an exemplary process of using PSAP beads at the point of sample collection, PSAP beads (~200 μm in diameter) are preloaded in a sample tube with a sieve (pore size, 0.5-1 mm) on top, a liquid sample is collected and infused into the tube, PSAP beads grow to about 1-2 mm within 1-2 minutes, during which analytical targets (e.g., enzyme, DNA, RNA, or virus) together with water are absorbed by SAP beads while undesired components (e.g., blood cells and bacteria) are excluded due to their larger size, leftover liquid is poured out keeping only the PSAP beads with analytical targets in the tube, and lastly the sieve is removed and a lid placed for storage and transportation.

The present liquid sample collection method and system extends the shelf life of the samples. For example, the pH inside the PSAP beads can be pre-set in a wide range during the synthesis and buffered due to the intrinsic properties of the polymers. Therefore, the analytical targets are preserved by such a buffer system immediately after they are captured by the beads. With additional tuning, bacteria can be excluded from the beads so that microbial spoilage is avoided. Removing larger components (e.g., blood cells) from the samples also reduces the chance of spoilage and contamination. Additional preservatives can be pre-loaded in SAP beads during the synthesis to achieve enhanced protection.

Additional benefits of using PSAP beads include the reduction of sample volume/weight for transportation and self-aliquoting. For example, blood cells approximately account for half volume/weight of a blood sample. Removing them at the point of collection can halve the transportation load. At the same time, the potentially-target-containing plasma is aliquoted into beads automatically. Use of the present invention can avoid the need for filtration, centrifugation, and/or pipetting.

In another exemplary embodiment, PSAP beads (~2 mm) are synthesized with pores of 0.5-1 μm that can capture analytical targets (<0.5 μm) while excluding bacteria and blood cells (>1 μm) in the biofluid samples, thus avoiding the impact of microbial spoilage and hemolysis on the shelf life of the analytical targets.

Interconnected pores inside a bead construct water channels and achieve separation of target species based on size exclusion, which allows the sorption of small molecules (e.g., ions and sugars) and most macromolecules (e.g., protein and nucleic acids), while rejecting large components (e.g., bacteria and blood cells).

In addition, the size of the target species also determines their distribution in the beads after the sample treatment. The macromolecular species with relatively high molecular weight mainly attach to the inner surface of the beads or suspend in the water channels, but some small species with very small molecular weight may be intercalated into the polymer chains together with water.

The present self-driven microfiltration treatment was examined with different sizes of target species (from ~1 nm to 15 μm) in various biofluid media (from simple saline to complex blood) and demonstrated effectiveness of the microfiltration and shelf life extension with the PSAP beads.

In another exemplary embodiment of the present invention, a method comprises receiving a specimen comprising a carrier, a first target species, and a first component, and storing at least a portion of the carrier and the first target species in a storage media by self-driven filtering of the specimen in the storage media. The storage media can comprise PSAP beads. The present invention can reduce sample volume, self-aliquot the liquid sample, avoid microbial contamination, separate plasma from blood cells, stabilize target species inside the beads, and enable long-term storage at room temperature.

In another exemplary embodiment of the present invention, a method comprises receiving a specimen comprising a carrier and components, and storing at least a portion of the carrier and a first analytical target in a storage media, wherein at least a portion of the components of the specimen comprise the first analytical target, wherein the storage media has a selective absorption profile configured to capture components having a size less than a capture size, and to exclude components having a size greater than a non-capture size, wherein the storage media has a swelling capacity profile configured to absorb and capture the first analytical target and the carrier, and wherein the first analytical target has a size less than the capture size.

The storing can comprise self-driven filtering of the specimen in the storage media resulting in the absorption and capture of the first analytical target and the carrier in the storage media, and the storage media can comprise a superabsorbent polymer. The storage media can comprise porous superabsorbent polymer beads.

The capture size can be less than approximately 0.5 μm and the non-capture size can be greater than approximately 1.0 μm.

The specimen can comprise a biofluid.

The porous superabsorbent polymer beads can have a porous structure for the selective absorption of the first analytical target in the biofluid, and the porous superabsorbent polymer beads can have a swelling capacity profile to capture the biofluid together with first analytical target inside the beads of the porous superabsorbent polymer beads.

The components can be selected from the group consisting of glucose, catalase, bacteriophage, bacteria, blood cells, and combinations thereof. The first analytical target can be selected from the group consisting of glucose, catalase, and bacteriophage.

In another exemplary embodiment of the present invention, a method comprises receiving a specimen comprising a carrier, a first target species, and a first component, and storing at least a portion of the carrier and the first target species in a storage media by self-driven filtering of the specimen in the storage media, wherein the storage media comprises porous superabsorbent polymer beads, wherein the porous superabsorbent polymer beads have a selective absorption profile configured to capture the first target species having a size less than a capture size, and to exclude the first component having a size greater than a non-capture size, and wherein the porous superabsorbent polymer beads have a swelling capacity profile configured to capture and absorb the first target species and the carrier in the porous superabsorbent polymer beads.

Relating to the beads, they can have a polyethylene glycol (PEG) content of at least 2.5 wt %. In another embodiment, they can have a PEG content of at least 5.0 wt %. In another embodiment, they can have a PEG content of at least 7.5 wt %. In another embodiment, they can have a PEG content of at least 15 wt %. In another embodiment, they can have a PEG content of at least 20 wt %. In another embodiment, they can have a PEG content of between 2.5 wt % and 20 wt %. In another embodiment, they can have a PEG content of between 5 wt % and 20 wt %. In another embodiment, they can have a PEG content of between 7.5 wt % and 20 wt %. In another embodiment, they can have a PEG content of between 10 wt % and 20 wt %. In another embodiment, they can have a PEG content of between 15 wt % and 20 wt %. In another embodiment, they can have a PEG content of between 5 wt % and 15 wt %. In another embodiment, they can have a PEG content of between 7.5 wt % and 15 wt %. In another embodiment, they can have a PEG content of between 10 wt % and 15 wt %.

The beads are preferably tuned to enable the stored analytical target to be analyzed after storage, wherein a length of storage is at least 1 day without degradation of the analytical target to a point that it cannot be analyzed. Degradation will of course depend on what type of analyzing is done. For example, if it is enzymatic activities of the analytical target, then the "amount" of degradation, and what is meant by "degradation" is evaluated against being able to determine enzymatic activities of the analytical target presumably as they were/might have been when first introduced to the beads.

Preferably the beads enable storage at room temperature.

The length of storage can be at least 3 days. The length of storage can be at least 5 days. The length of storage can be at least 7 days.

In another exemplary embodiment, the present invention is a method comprising self-aliquoting a sample comprising a first analytical target by introducing the sample to porous superabsorbent polymer beads that capture a least a portion of the first analytical target, wherein the porous superabsorbent polymer beads are tuned in order to enable storage at room temperature of the stored first analytical target in the porous superabsorbent polymer beads.

In another exemplary embodiment, the present invention is a method comprising self-aliquoting a sample comprising a first analytical target by introducing the sample to porous superabsorbent polymer beads that capture a least a portion of the first analytical target, wherein the porous superabsorbent polymer beads are tuned in order to enable testing of the stored first analytical target at a date/time subsequent to the introducing.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

Implementations, features, and aspects of the disclosed technology are described in detail herein and are considered a part of the claimed disclosed technology. Other implementations, features, and aspects can be understood with reference to the following detailed description, accompanying drawings, and claims. Wherever possible, the same reference numbers are used throughout the drawings to refer to the same or like elements of an embodiment. Reference will now be made to the accompanying figures and flow diagrams, which are not necessarily drawn to scale.

FIGS. 4A-4C 5 wt % of polyethylene glycol (PEG). FIGS. 4D-4F 10 wt % of PEG. FIGS. 4G-4I 20 wt % of PEG. FIGS. 4J-4L 30 wt % of PEG. The three polymerization temperatures were 70, 80 and 90° C., respectively. Acrylamide (AM), N,N'-methylenebisacrylamide (MBA), and ammonium persulfate (APS) concentrations were maintained constant at 10, 4, and 0.3 wt %, respectively. The reaction time was 15 minutes for each condition. The scale bars are all 5 μm.

FIG. 5A SA:AM=2:8. FIG. 5B SA:AM=4:6. FIG. 5C SA:AM=6:4. FIG. 5D SA:AM=8:2. The total monomer concentration was fixed at 10 wt %. The MBA, APS and PEG concentrations were maintained constant at 4, 0.3, and 20 wt %, respectively. All beads were polymerized at 70° C. for 15 minutes.

(FIGS. 7A, 7D) 1.0 wt %, (FIGS. 7B, 7E) 0.5 wt %, and (FIGS. 7C, 7F) 0.1 wt %. All beads were polymerized at 70° C. for 15 minutes. The scale bars are all 5 μm.

FIGS. 8A-8B are a schematic of microfiltration treatment and recovery of target species. FIG. 8A, use PSAP beads to absorb liquid samples and capture analytical targets while excluding undesired components. FIG. 8B, the analytical targets inside the PSAP beads were released by ultrasonication for further characterization.

FIG. 10 includes SEM images of the PSAP beads polymerized by precursors containing 2.5 or 5 wt % of PEG.

FIG. 13A is a graph of the normalized diameter of the PSAP beads of FIG. 10 prepared with different PEG contents (2.5, 5, 10, and 20 wt %) in the saline over time. FIG. 13B incudes optical images of the PSAP beads prepared with different PEG contents during the swelling process. The scale bar is 2 mm.

FIGS. 15A-B illustrates the uniform size and swelling capacity of the PSAP beads. FIG. 15A is a graph of the average weight of a single dry PSAP bead prepared with different PEG contents (10, 15, and 20 wt %). For each PEG content, 20 of dry PSAP beads were measured. FIG. 15B is a graph of the average (weight of a single hydrated PSAP bead after 5 minutes swelling in 0.9% NaCl solution. For each PEG content (10, 15, or 20 wt %), 20 of dry PSAP beads were applied to swelling.

FIGS. 16-19 illustrate microfiltration performance analysis in the saline medium. FIG. 16 is a graph of catalase recovery and *E. coli* rejection using PSAP beads with a PEG content from 2.5 to 20 wt %. FIG. 17 illustrates the distribution of fluorescent microspheres on the cross-section of the PSAP beads after the treatment. FIG. 18A, the small fluorescent analytical target used was 0.1 μm in diameter. FIG. 18B, the large fluorescent target used was 2 μm in diameter. FIG. 19 is a graph of the normalized fluorescence intensity from the edge to the core of the beads.

FIGS. 20-24 illustrate microfiltration performance of the PSAP beads in biofluid media. FIG. 20 is a graph of the normalized diameter of the PSAP beads in different biofluid media over time. FIG. 21 is a graph of the swelling ratio of the PSAP beads in biofluid media. The PSAP beads were prepared with 10 wt % of PEG. FIG. 22 illustrate optical images of the PSAP beads during the swelling process. The scale bar is 2 mm. FIG. 23 is a graph of the recovery efficiency for glucose, catalase, and bacteriophage MS2 after the microfiltration treatment. FIG. 24 includes bright-field microscopy images of the hydrated PSAP bead after swelling in the bovine blood medium.

FIG. 25 is a graph of catalase activity in the saline medium dosed with *B. subtilis* during the 7-day storage at 4, 22, or 35° C. The initial bacterial dosage is ~50 CFU/mL. FIG. 26 is a graph of bacterial concentration that is corresponding to the catalase activity in FIG. 25 at each sampling time during the 7 days. The dashed line in FIG. 26 indicates no live bacteria are detected in the agar plates. FIG. 27 is a graph of catalase activity in the hydrated PSAP beads after the microfiltration treatment during the 7-day storage at 4, 22, or 35° C. FIG. 28 are difference interference contrast microscopy images of the liquid control and the hydrated PSAP bead after the 7-day storage at 35° C.

FIGS. 29-30 illustrate shelf life extension of catalase in the plasma medium by microfiltration treatment. FIG. 29 is a graph of catalase activity in the liquid control during the 7-day storage at 4, 22, or 35° C. The dashed line in a indicates no active catalase is detected in the spectrophotometric assay. FIG. 30 is a graph of catalase activity in the hydrated PSAP beads after microfiltration treatment during the 7-day storage at 4, 22, or 35° C.

DETAILED DESCRIPTION OF THE INVENTION

Figure 1:
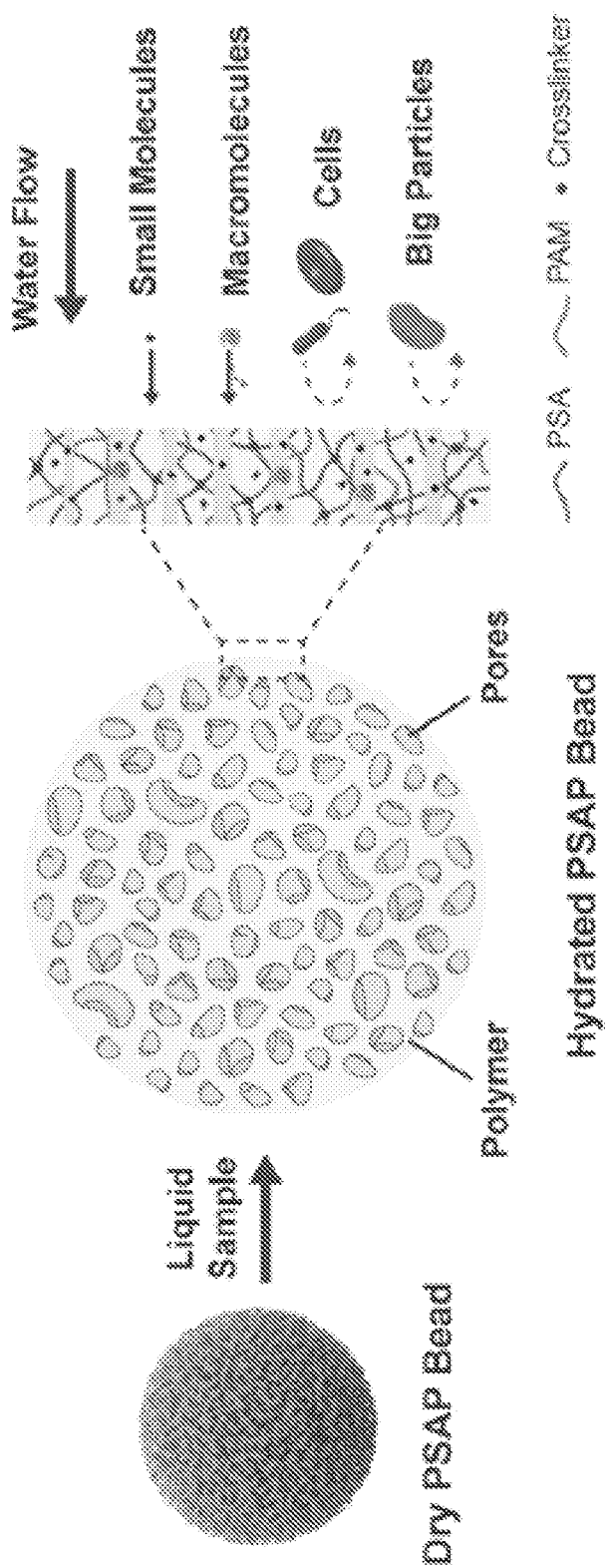
FIG. 1 is a schematic of PSAP beads for the microfiltration of target species in biofluid specimens according to an exemplary embodiment.

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

As used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

Using "comprising" or "including" or like terms means that at least the named compound, element, particle, or method step is present in the composition or article or method, but does not exclude the presence of other compounds, materials, particles, method steps, even if the other such compounds, material, particles, method steps have the same function as what is named.

Mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As shown in FIG. 1, PSAP beads for the microfiltration of target species in biofluid specimens capture small analytical targets while rejecting large undesired components along the water absorption to achieve the self-driven microfiltration. The polymer network of the beads can be synthesized by PSA crosslinked with PAM.

The interconnected pores inside a bead construct water channels and achieve separation of target species based on size exclusion, which allows the sorption of all small molecules (e.g., ions and sugars) and most macromolecules (e.g., protein and nucleic acids) while rejecting large components (e.g., bacteria and blood cells). In addition, the size of the target species also determines their distribution in the beads after the sample treatment. The macromolecular species with relatively high molecular weight mainly attach to the inner surface of the beads or suspend in the water channels, but some small species with very small molecular weight may be intercalated into the polymer chains together with water.

A dry-bath batch method was used to prepare millimeter-sized and bullet-shaped PSAP beads via polymerization induced phase separation. (FIGS. 2-3) The pores were formed by the polymerization and crosslinking of monomers in an aqueous PEG solution, in which the crosslinked polymer chains constructed a scaffold while PEG served as a porogen. On the basis of the previous studies, the polymerization conditions including reaction temperature, monomer composition, and crosslinking degree were optimized to obtain PSAP beads with desired uniform morphology and swelling behavior as described hereinbelow.

Experimental Methods

Chemicals and Biomaterials

AM, 99%; SA, 97%; MBA, 99%; PEG, average Mn=6000 g mol$^{-1}$; APS, 98%; urea (99%); potassium phosphate monobasic (KH$_2$PO$_4$, 99.0%); potassium phosphate dibasic (K$_2$HPO$_4$, 99.0%); sodium phosphate monobasic (NaH$_2$PO$_4$, 99.0%); sodium hydroxide (NaOH, 97.0%); hydrogen peroxide (H$_2$O$_2$, 30 wt % in water); catalase (lyophilized powder, ~2000-5000 U/mg); and D-(+)-glucose (99.5%) were purchased from Sigma-Aldrich (St. Louis, MO). NaCl, 99.0%; sodium sulfate (Na$_2$SO$_4$, 99.0%); potassium chloride (KCl, 99.0%); magnesium chloride (MgCl$_2$, 99.0%); and calcium chloride (CaCl$_2$, 99.0%) were obtained from VWR Chemicals BDH (Radnor, PA).

All chemicals were used as received without further purification. DI water with a resistivity of 18.2 MΩ cm was produced by a Barnstead nanopure water system (Thermo Scientific, Waltham, MA) and used throughout the experiments. Phosphate buffer (50 mM) was prepared by dissolving K$_2$HPO$_4$ (30.75 mM) and KH$_2$PO$_4$ (19.25 mM) in DI water, which was subsequently adjusted to a pH of 7 at room temperature by 1 M NaOH solution.

*Escherichia coli* (*E. coli*, ATCC 10798 and 15597), *Bacillus subtilis* (*B. subtilis*, ATCC 6051), and bacteriophage *Escherichia* virus MS2 (ATCC 15597-B1) were obtained from the American type culture collection (ATCC). Luria-Bertani broth (LB broth), Luria-Bertani agar (LB agar), tryptic soy broth (TS broth), tryptic soy agar (TS agar), nutrient broth and nutrient agar were obtained from BD Difco (Franklin Lakes, NJ).

Preparation and Characterization of Liquid Samples

Glucose was dissolved in saline or synthetic urine medium to reach a concentration of 5 mM. Bovine plasma already contained ~5 mm of glucose, and there would be no need for an extra dosage. The glucose concentration was detected by the colorimetric method using EnzyChrom glucose assay kit II (BioAssay Systems, Hayward, CA). In general, a 20 µL sample was added to a 1 mL plastic cuvette containing 80 µL of working reagent and 900 µL of water, which was mixed well and incubated at room temperature for 20 minutes. The absorbance of the reaction mixture at 340 nm was proportional to the glucose concentration in the sample, and the coefficient was obtained from the slope of the standard curve. The effective concentration range for this glucose assay was 0.1 to 3 mM, and any sample beyond this range required appropriate dilution.

The catalase stock solution was prepared by dissolving catalase powder in saline medium (5 mg/mL) and then filtered by 0.2 µm syringe filter (VWR International, Radnor, PA) to remove any undissolved particles or potential microorganisms. Then, the catalase stock was diluted 10 times by saline or biofluid media (synthetic urine or bovine plasma) to reach a final activity at ~800 U/mL. Since catalase exited in red blood cells, bovine blood did not require a dosage for catalase.

The activities of all catalase samples were determined by a standard spectrophotometric method. Specifically, the catalase sample was first diluted to the desired detection range of ~50 to 100 U/mL. Next, 0.1 mL of the catalase sample was added to a 3 mL quartz cuvette containing 2.9 mL of hydrogen peroxide solution (0.04 wt % of H$_2$O$_2$ in the phosphate buffer) and mixed immediately by inversion. The decrease in absorbance of the mixture was monitored by a UV-Vis spectrophotometer (Cary 50, Santa Clara, CA) at 240 nm for one minute and analyzed using a linear regression model. Three replicates were performed for each sample. The catalase activity in the 0.1 mL sample (c, U/mL) was determined by the reduction rate of absorbance (k, min$^{-1}$):

$$c = -\frac{k*30}{1.0 \ \mu\text{mole min}^{-1}U^{-1} * 43.6 \ M^{-1}\text{cm}^{-1} * 1.0 \ \text{cm}} \quad (1)$$

in which 1.0 µmole min$^{-1}$ U$^{-1}$ was the decomposition rate of HO by catalase, 43.6 M$^{-1}$ cm$^{-1}$ was the molar extinction coefficient for H$_2$O$_2$ at 240 nm, 1.0 cm was the light path, and 30 was the dilution ratio.

Bacteriophage MS2 was cultured with the host *E. coli* (ATCC 15597) in a TS broth at 35° C. for ~6 hours. The TS broth was subsequently centrifuged at 4000 rpm for 5 minutes, and the supernatant was filtered through a 0.2 µm filter to remove the residual *E. coli* cells. The purified MS2 was diluted and dispersed in saline or biofluid media (synthetic urine or bovine plasma) to achieve a concentration of ~1000 PFU/mL. The concentration of MS2 was subsequently quantified by the double agar layer method with three replicates for each sample.

*E. coli* cells (ATCC 10798) were cultured in the LB broth to log phase (35° C. overnight) and harvested by centrifugation at 4000 rpm. After washing with normal saline three times, the *E. coli* suspension was diluted and dispersed in the saline medium to achieve the desired concentration of ~500 CFU/mL. The concentration of live *E. coli* was measured using a standard spread plating method with three replicates for each measurement.

Calculation of Recovery or Rejection Efficiency

The recovery efficiency of the target species (e.g., glucose, catalase, or bacteriophage MS2) was determined by comparing the concentration or activity of the target species released from the PSAP beads (c$_t$) and in the original liquid sample (co). In brief, 10 PSAP beads were applied to treat 1 mL of the liquid sample. The 10 PSAP beads were taken out until swelling equilibrium achieved and then weighted (m). Next, the hydrated beads in a clean tube were immersed by 2 mL of added water (m$_{water}$) and then broken by 5 seconds ultrasonication using a probe sonicator (Qsonica Q125, Newtown, CT) at 75% of amplitude. Thus, the dilution factor (DF) for the target species was calculated:

$$DF = \frac{m + m_{water}}{m} \quad (2)$$

The dilution factor could be adjusted by changing the amount of added water (m$_{water}$). After releasing the target species from the hydrated beads, the concentration or activity of the target species in the well-mixed suspension was measured (c$_t$) to analyze the recovery efficiency for each target species:

$$\text{Recovery (\%)} = \frac{c_t}{c_0} * DF * 100 \quad (3)$$

For the recovery efficiency calculation, the weight of the dried beads was negligible due to the high swelling ratio of the beads. Another assumption to simply the calculation was the density change during the dilution process was ignored, i.e., the density of the suspension was equal to that of the hydrated beads.

The rejection efficiency of the target species (e.g., *E. coli* or red blood cell) was determined by comparing the concentration of the target species in the residual liquid sample after the treatment ($c_r$) and in the original liquid sample ($c_0$). The operation was similar to the process that determined the recovery efficiency. A total of 10 PSAP beads were applied to treat 1 mL of liquid sample ($V_0$), which were subsequently taken out and weighted (m). The volume of the residual liquid sample ($V_r$) was calculated:

$$V_r = V_0 - m/\rho \tag{4}$$

in which the p was the density of the hydrated beads (approximately, the density of the biofluid media). Therefore, the rejection efficiency was determined as follows:

$$\text{Rejection (\%)} = \left(1 - \frac{c_0 V_0 - c_r V_r}{(V_0 - V_r) c_0}\right) * 100 \tag{5}$$

Optimization for the PSAP Bead Synthesis

Based on previous studies, the effects of the polymerization conditions (polymerization temperature, monomer composition, crosslinking degree, and porogen concentration) were investigated on the pore structure and swelling behaviors of the resultant PSAP beads. The reaction mixtures containing 10% of AM, 4% MBA and 0.3% APS were added PEG as the porogen (5-30 wt %) and polymerized at three temperatures (70-90° C.) to prepare porous PAM beads.

The results shown in FIGS. 4A-4L indicate that the morphology of the beads is mainly dependent on the PEG content. When the polymerization temperature is 70° C., no obvious pores can be found in the PAM beads with 5 wt % of PEG. As the PEG content increases from 5 to 10 wt %, the resultant beads have a few pores, but those pores are small and disconnected. When the PEG content is further increased, both the porosity and the average pore size of the beads increase, and the as-synthesized beads show a uniform pore distribution.

On the other hand, the polymerization temperature is another important factor for phase separation together with the pore structure formation during the polymerization. At the same PEG content (e.g., 10 wt %), the porosity and the average pore size of the PAM beads increase as the polymerization temperature increases (FIGS. 4A-4L). Nevertheless, although a higher temperature can accelerate and enhance the phase separation between the polymer network and the porogen, a relatively rapid separation rate causes more uneven distribution of pores and the formation of some big pores in the beads. Therefore, 70° C. was selected as the optimal polymerization temperature for further optimization of the PSAP bead synthesis.

The swelling capacity of the polymer depends on the crosslinking degree, charge density, and polymer concentration of the polymer network. These three factors are related to the concentrations of the crosslinker, the ionic comonomer, and the total monomers in the initial reaction precursor, respectively. Based on the design criteria, the PSAP beads should have a high swelling ability in the water and aqueous solutions, so that the proposed microfiltration treatment of biofluid samples enabled by the PSAP beads is a spontaneous process and does not need additional driving forces.

However, regardless of the PEG contents, the swelling ratio of the as-prepared porous PAM beads is less than 10 g/g in DI water, which is not adequate for the demand of super absorbency.

To improve the swelling capacity, an ionic comonomer, SA, was introduced to the reaction system for the production of PSAP beads. The porous poly(SA-co-AM) beads were prepared by precursors containing 2-8 wt % of SA monomers while the total monomer concentration was fixed at 10 wt %. The addition of ionic monomers changed the precursor properties and polymerization mechanism thus affected the subsequent phase separation and pore generation.

As illustrated in FIGS. 5A-5D, when the SA concentration is 2 wt %, the surface of the resulting bead is covered by a dense nonporous polymer layer and numerous extremely small pores distribute inside the bead. As the SA concentration is increased to 4 or 6 wt %, the beads show a uniform porous dendritic structure and the average pore size is between 1 to 2 µm. If the SA concentration is further increased to 8 wt %, the porosity significantly decreases as well as some particles are embedded on the polymer network. Therefore, a reaction mixture with the monomer ratio (SA/AM) of 4:6 or 6:4 was chosen in the following experiments for further improvement of the bead swelling capacity.

As mentioned, the swelling capacity of the polymer is highly affected by the crosslinking degree. A high crosslinking degree results in the difficulty of water diffusing into the polymer network due to a more compact polymer structure. Hence porous poly(SA-co-AM) beads with the MBA concentration from 1 to 0.1 wt % were prepared and characterized.

Figure 6:
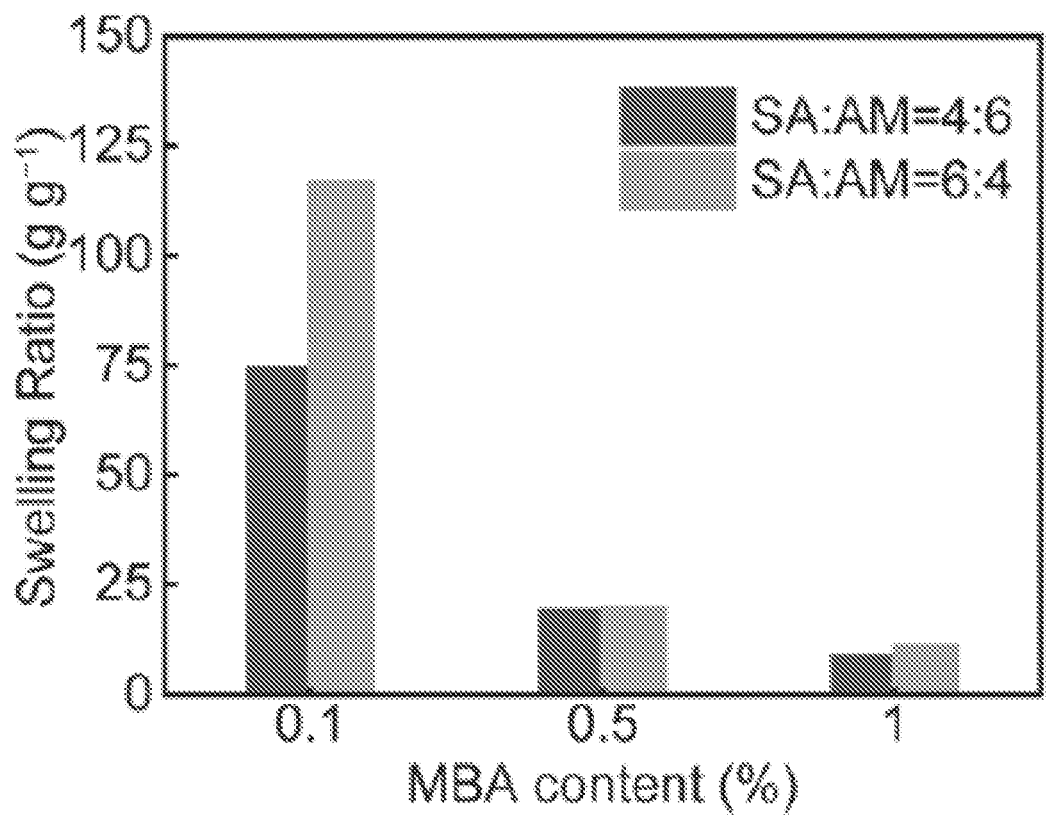
FIG. 6 illustrates the swelling ratio of the poly(SA-co-AM) beads in deionized (DI) water. The PAS beads were prepared by reaction mixtures containing 4 or 6 wt % of SA monomers. The total monomer concentration was fixed at 10 wt %. The APS and PEG concentrations were maintained constant at 0.3 and 10 wt %, respectively. The MBA concentration ranged from 0.1 to 1 wt %. All beads were polymerized at 70° C. for 15 minutes.
Figures 7A, 7B, 7C, 7D, 7E, 7F:
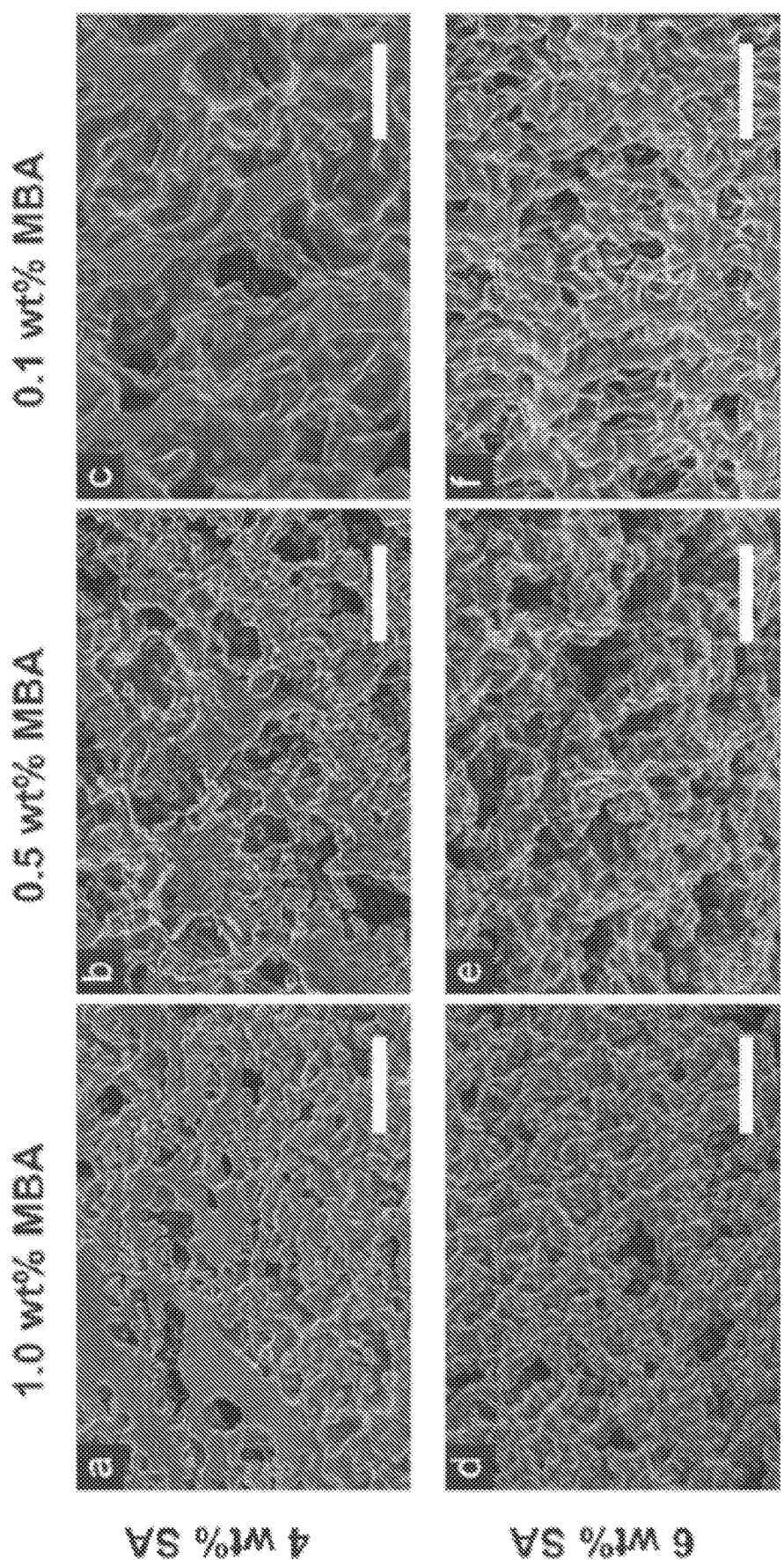
FIGS. 7A-7F are SEM images of the poly(SA-co-AM) beads with different crosslinking degrees and charge densities. The PSAP beads were prepared by reaction mixtures containing 4 or 6 wt % of SA monomers. The total monomer concentration was fixed at 10 wt %. The APS and PEG concentrations were maintained constant at 0.3 and 10 wt %, respectively. The MBA concentration ranged from 1.0 to 0.1 wt %.

FIG. 6 illustrates the weight swelling ratio of the beads at equilibrium in DI water. The results indicate that the crosslinking degree is the dominant factor for the swelling capacity of the beads. As expected, the swelling ratio of the beads increases as the MBA concentration decreases despite the monomer composition. At a high crosslinking degree (0.5-1 wt % of MBA), there is almost no difference in the swelling ratio for both the precursors. While at a low crosslinking degree (<0.5 wt % of MBA), the impact of the charge density in the swelling ratio becomes more distinct. For example, the swelling ratio of the beads prepared by 6 wt % of SA is ~60% higher than those prepared by 4 wt % of SA (117 versus 74 g/g) when the MBA concentration is 0.1 wt %. This is because the increase of the ionic group number from the SA monomers results in the increase of counterion concertation inside the polymer network, which contributes to an additional osmotic pressure improving the polymer swelling.

The change of the crosslinking degree also has a slight impact on the pore structure of the resultant beads. As shown in FIGS. 7A-7F, a higher crosslinking degree (i.e., a high MBA concentration) results in a more rigid polymer network with more small pores while a lower crosslinking degree (i.e., a low MBA concentration) results in a more relaxed network with a uniform pore distribution. Since the poly (SA-co-AM) beads containing 6 wt % of SA and 4 wt % of AM have both a high swelling capacity and a uniform pore distribution, this composition was selected as the optimal monomer composition for preparing the prospective PSAP beads.

Preparation of PSAP Beads

Figure 2:
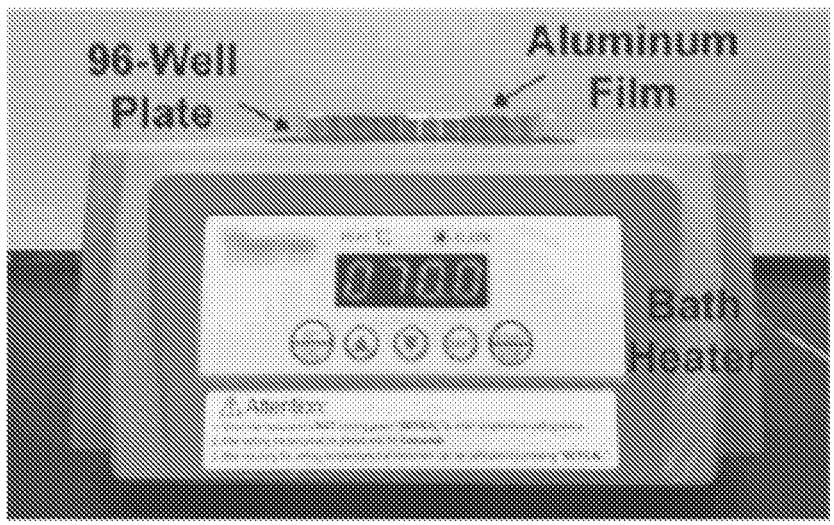
FIG. 2 is the experimental setup for PSAP bead preparation according to an exemplary embodiment. The 96-well plate was filled by the precursor (15 μL in each well).
Figure 3:
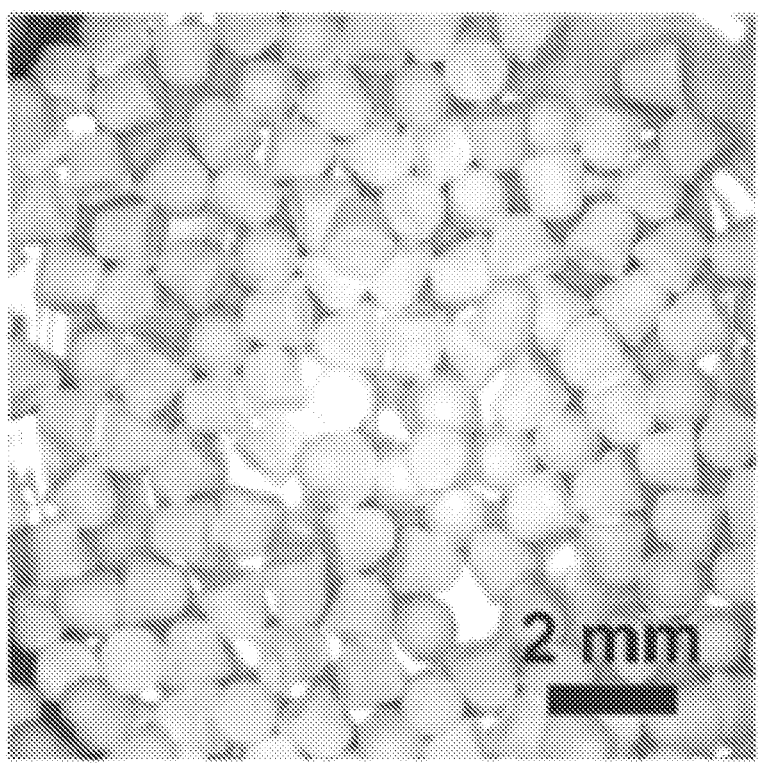
FIG. 3 is an optical image of the as-prepared PSAP beads.
Figures 4A, 4B, 4C, 4D, 4E, 4F, 4G, 4H, 4I, 4J, 4K, 4L:
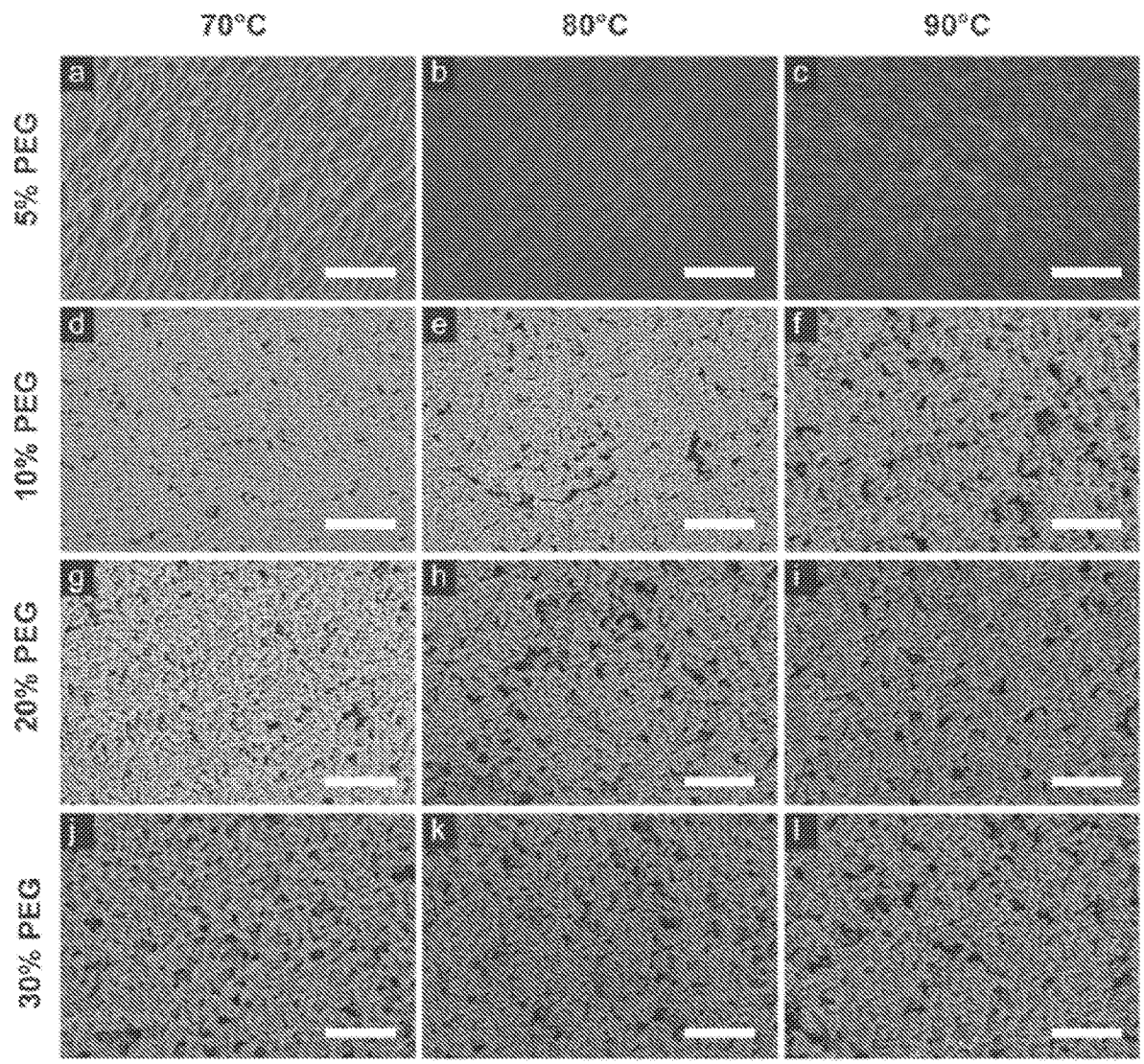
FIGS. 4A-4L are scanning electron microscope (SEM) images of polyacrylamide (PAM) beads prepared with different polymerization conditions.
Figures 5A, 5B, 5C, 5D:
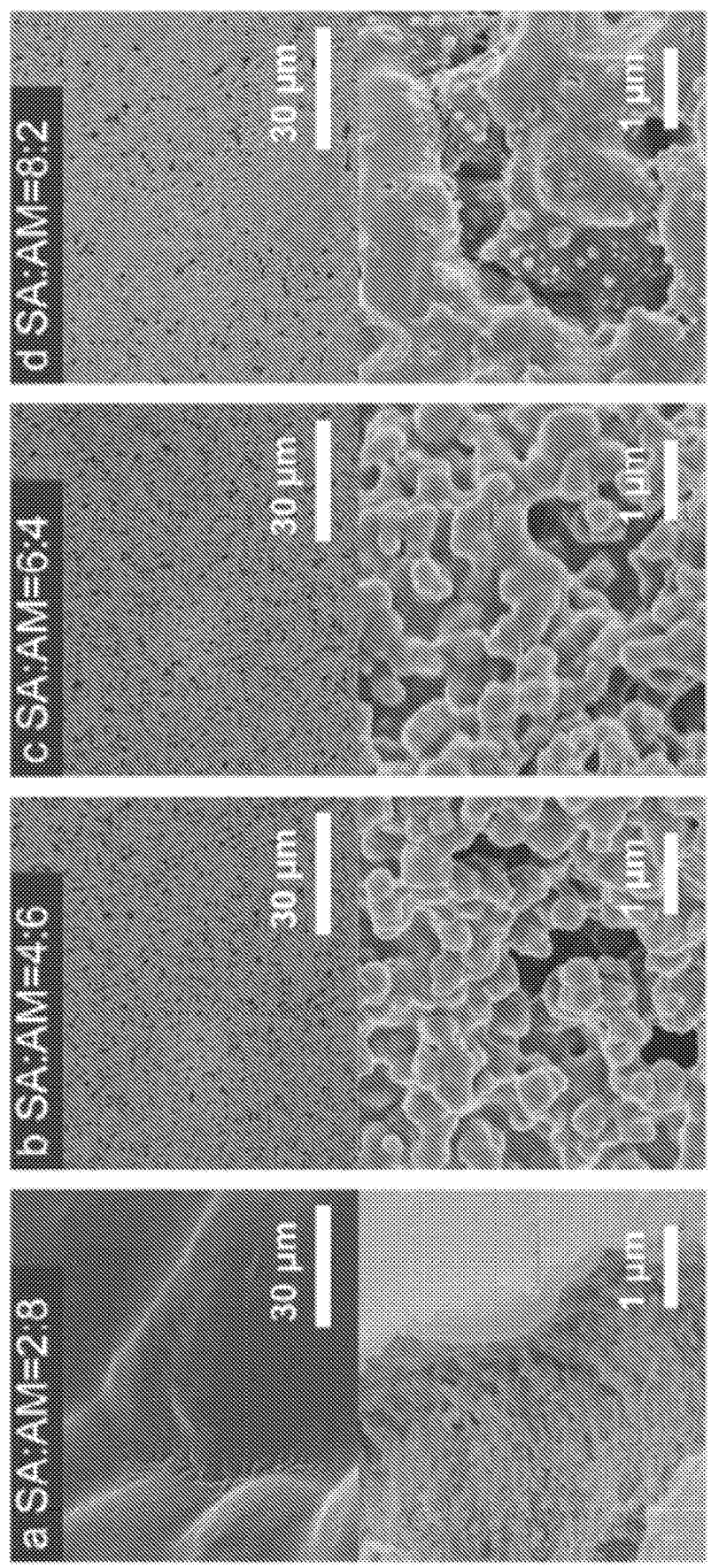
FIGS. 5A-5D are SEM images of the poly(stearyl acrylate-co-acrylamide) (poly(SA-co-AM) beads with different monomer compositions.

As discussed, to prepare PSAP beads, a reaction mixture containing 4 wt % AM, 6 wt % SA, 10 wt % PEG and 0.2 wt % MBA in DI water was prepared and ultrasonicated until fully dissolved. After being de-gassed by nitrogen bubbling for 5 minutes, the aqueous solution was added to 0.3 wt % APS and mixed well. An aliquot of 15 µL of the reaction mixture was transferred to each well of a 96-well plate, and the plate was sealed with an aluminum film and then placed into a bath heater (Thermo Scientific, Waltham, MA) for 15 minutes at 70° C. (FIG. 2). The resultant polymer beads were thoroughly washed with ethanol to remove the porogen, PEG, and fully dehydrated in a 60° C. oven.

Material Characterization

The morphology of dried PSAP beads was characterized by scanning electron microscopy (SEM, Hitachi SU8230, Tokyo, Japan) at 3 kV. The specimens were coated with gold for 10 seconds at 20 mA using a sputter coater (Quorum Q150T ES, Lewes, United Kingdom). The pore structure characteristic parameters of the as-prepared PSAP beads were determined by mercury intrusion porosimetry (MIP, Micromeritics Autopore IV, Nor-cross, GA). The swelling process of the PSAP beads in liquid media was monitored under a digital microscope (Dino-Lite AM73915, Torrance, CA), in which both the diameter and weight of the swollen gel were measured to calculate the normalized diameter ($d_{normalized} = d_{swollen}/d_{dried}$) and weight swelling ratio $S = ((m_{swollen} - m_{dried})/m_{dried})$, respectively.

Microfiltration Performance Test

The performance of the PSAP beads prepared with varying PEG contents (2.5 to 20 wt %) for microfiltration was demonstrated using catalase and *Escherichia coli* (*E. coli*, ATCC 10798). A typical microfiltration treatment, illustrated in FIG. 8A, was performed as follows:

(i) PSAP beads were preloaded in sample tube with a sieve on top.
(ii) A liquid sample was collected and infused into the tube.
(iii) PSAP beads absorbed water together with analytical targets but excluded undesired larger components.
(iv) The leftover liquid was poured out, keeping only the hydrated PSAP beads with the captured analytical targets in the tube.
(v) The sieve was removed and put on a lid for storage.

The liquid sample of catalase or *E. coli* in the saline medium (i.e., 0.9% NaCl solution) was prepared as discussed above. The original dosage was ~800 U/mL for catalase or ~500 CFU/mL for *E. coli*. In general, 10 of the dry beads were applied to treat 1 mL of the liquid sample. After the microfiltration treatment, to extract small target species (i.e., catalase) from the hydrated beads, the beads were immersed in added DI water and then broken by 5 seconds of ultrasonication using a probe sonicator (Qsonica Q125, Newtown, CT) at 75% amplitude (FIG. 8B). The activity of the released catalase in the well-dispersed suspension with polymer debris was measured using a UV spectrophotometric method and compared to the original activity to determine the recovery efficiency for catalase. For large components (i.e., *E. coli*) excluded by the PSAP beads, the bacterial concentration in the residual liquid after the microfiltration treatment was quantified by standard spread plating techniques to calculate the rejection efficiency for *E. coli*.

Distribution of Target Species in Hydrated PSAP Beads

Imaging and analysis of the target species absorbed or adsorbed by the hydrated PSAP beads after the microfiltration treatment were performed with a fluorescence microscope (Zeiss, Oberkochen, Germany). The PSAP beads were applied to treat a saline medium containing 0.1 or 2 µm fluorescent latex microspheres as model analytical targets (0.25 mg/mL, Sigma-Aldrich, St. Louis, MO). After the treatment, the PSAP beads were cut in half, and the fluorescent analytical targets on the cross sections of the beads were imaged by fluorescence microscopy using a 63× objective lens together with a charge-coupled device camera.

For each PSAP bead, the fluorescent images at different locations of the cross-section (40 images in total) were integrated to provide a two-dimensional mapping of individual fluorescent analytical targets. The integrated image was then divided into columns and processed to analyze the change of fluorescence intensity from the edge to the core of the bead, in which the maximum fluorescence intensity at the bead edge was set as a baseline and intensities at different distances were normalized to the baseline.

Microfiltration Performance with Biofluid Samples

The synthetic urine medium was prepared with urea and minerals as summarized in TABLE I.

TABLE I

| Compound | Concentration (g/L) |
|---|---|
| Urea | 15.0075 |
| NaCl | 2.5715 |
| $Na_2SO_4$ | 2.1305 |
| KCl | 2.9820 |
| $MgCl_2$ | 0.3809 |
| $NaH_2PO_4$ | 2.3995 |
| $CaCl_2$ | 0.4440 |
| pH* | 6.0 |

* The Ph was adjusted by 1 M NaOH solution.

The bovine plasma and bovine blood stabilized with citrate were purchased from Hardy Diagnostics (Santa Maria, CA) and used within the quality guarantee period. All three biofluid media were stored at 4° C. before use. Both the swelling kinetics and swelling ratio of the PSAP beads in each biofluid medium at room temperature were measured, respectively.

For micro-filtration performance tests, the PSAP beads were applied to treat biofluid samples with target species such as glucose, catalase, or bacteriophage MS2 (ATCC 15597-B1). After the treatment, the target species captured by the hydrated PSAP beads were then released by ultrasonication and characterized to analyze recovery efficiency for each target species. For cell exclusion in bovine blood treatment, catalase was used as an indicator for red blood cells since it only existed in the red blood cells. The catalase activities, which correspond to the red blood cell concentrations, in the original blood sample and the blood sample after the microfiltration treatment were measured to analyze the cell rejection efficiency (similar to the rejection efficiency calculation for. coli). In addition, the PSAP beads after the treatment were cut in half, and their cross sections were imaged by microscopy.

Shelf Life in Saline Under Bacterial Contamination

The shelf life of catalase was first measured in a saline medium, which contained nutrient broth (10 mg/mL) to support bacterial growth. Catalase powder was dissolved in the above medium to achieve a concentration of 0.5 mg/mL, corresponding to an activity of ~~1000 U/mL. The catalase solution was then filtered via 0.2 µm syringe filter to remove any undissolved aggregates or potential microorganisms. *Bacillus subtilis* (*B. subtilis*, ATCC 6051) was cultured in nutrient broth to the log phase (35° C. overnight) and then dosed to the catalase solution (~50 CFU/mL dosage). After preparing the liquid sample, 0.3 g of the PSAP beads (~300 beads) were applied to treat 30 mL of the sample for 5 minutes, which were then separated from the liquid and divided into three glass vials (5 g hydrated PSAP beads for each group).

The three vials were stored at three temperatures, 4° C., room temperature (22±1° C.), and 35° C., respectively. Meanwhile, another three vials, each containing 5 mL of catalase sample dosed with *B. subtilis*, were also stored at 4 to 35° C. as control groups. After a certain storage time, five of the hydrated PSAP beads were taken out from each vial for catalase activity measurement and recovery efficiency analysis. In addition, 0.5 mL of the liquid from each control was sampled to detect the remaining catalase activity together with the bacterial concentration. All catalase activity data collected, including both the control groups and PSAP groups, were normalized to the initial baseline value of catalase activity in the liquid control at each temperature, respectively.

Shelf Life in Blood Plasma Medium

The catalase stock solution was prepared by dissolving catalase powder in saline solution (5 mg/mL) and then filtered using a 0.2 μm syringe filter. Then, the catalase stock was directly dosed to bovine plasma medium at a 10 times diluted concentration. After that, the PSAP beads were applied to treat the liquid sample (similar to the shelf life study in the saline medium except for the treatment time in the plasma medium is 30 minutes). The activity of catalase inside the hydrated PSAP beads and in the liquid control was investigated along the storage time.

Figure 9:
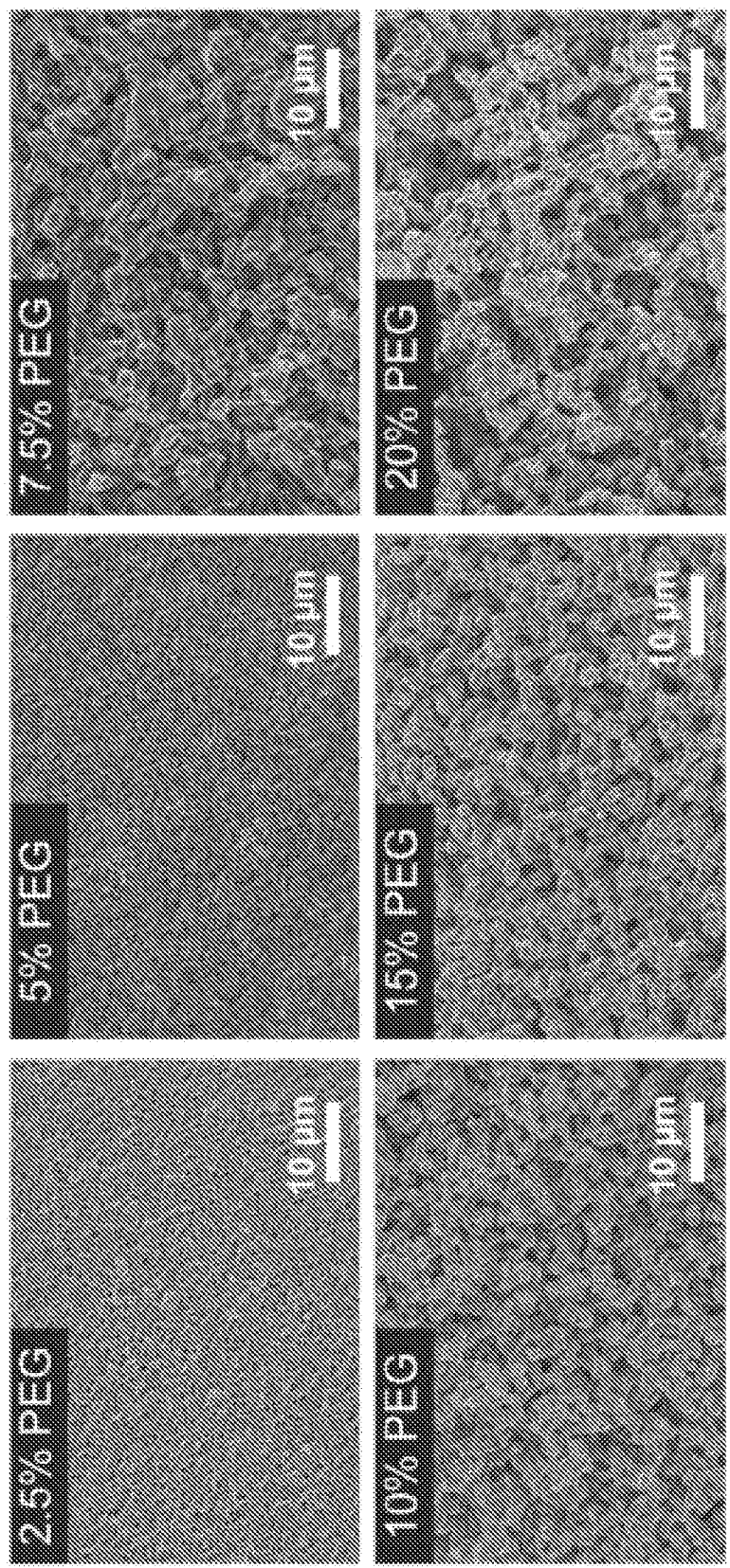
FIG. 9 includes SEM images of PSAP beads polymerized by precursors containing different concentrations of PEG-6000 from 2.5 to 20 wt %.
Figure 10:
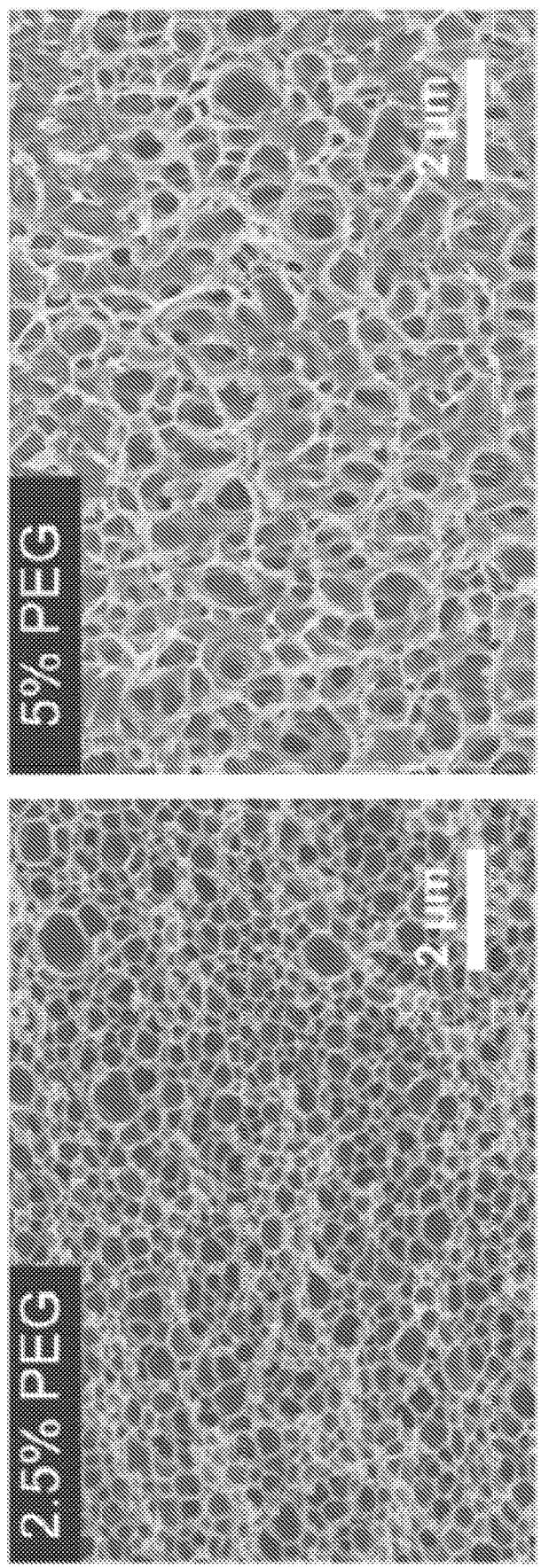

In addition to the hereinabove description of Experimental Methods, to investigate effects of the PEG concentration on the pore structure of the resulting PSAP beads, reaction mixtures with an addition of different PEG amounts (2.5, 5, 7.5, 10, 15, and 20 wt %) were prepared, and the as-synthesized dry PSAP beads were characterized by SEM. As shown in FIG. 9, the morphology of the beads is strongly affected by the precursor composition. At a PEG content of 2.5 or 5 wt %, the PSAP beads reveal a continuous polymer network with small spherical pores (FIGS. 9-10).

When the PEG content is higher than 5 wt %, the polymer scaffold changes to a dendritic structure with interconnected irregular shaped pores. The significant morphology shift is due to the polymer-solvent interaction during phase separation. For a precursor with a high PEG concentration, the phase separation process occurs prior to the gel point because of the repulsion between the polymer segments and the aqueous PEG solution. As a result, the porogenic nuclei aggregate and a discontinuous polymer network is formed with large pores. Therefore, with the growing PEG content, the pore size of the PSAP beads increases. However, once the PEG content reaches 20 wt %, a relatively high repulsive interaction results in large cavities inside the polymer system, and these defects may diminish the selectivity of the PSAP beads in the present microfiltration applications.

MIP was used to measure the total pore volume, total pore area, and bulk density of the dry PSAP beads for analysis of the pore structure minerals as summarized in TABLE II.

TABLE II

| PEG Content (wt %) | Total Intrusion Volume* (cm³/g) | Total Pore Area (m²/g) | Bulk Density (g/cm³) |
| --- | --- | --- | --- |
| 2.5 | 0.1395 | 17.017 | 1.0526 |
| 5.0 | 0.2398 | 26.125 | 1.0197 |
| 7.5 | 0.4871 | 10.871 | 0.8731 |
| 10 | 0.6529 | 12.375 | 0.7489 |
| 15 | 1.0426 | 14.962 | 0.5730 |
| 20 | 1.1126 | 23.179 | 0.5448 |

* The mercury intrusion test was operated using the following parameters: the contact angle was 130°, the mercury surface tension was 485 dyn/cm, and the maximum intrusion pressure was 4.68 psia.

Figure 11:
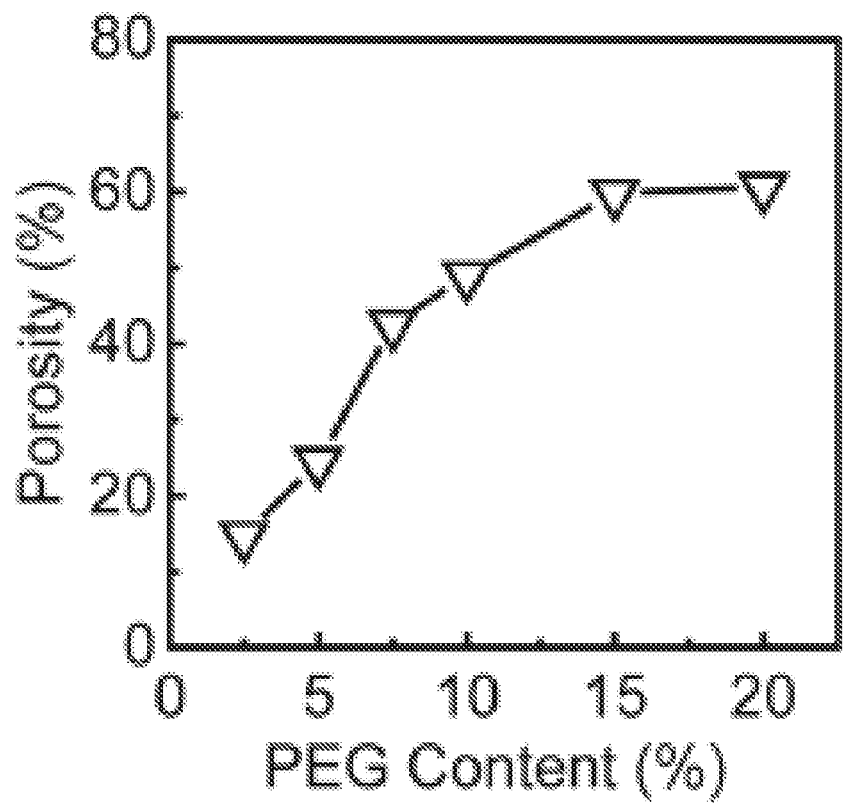
FIG. 11 is a graph of porosity of the PSAP beads of FIG. 9.
Figure 12:
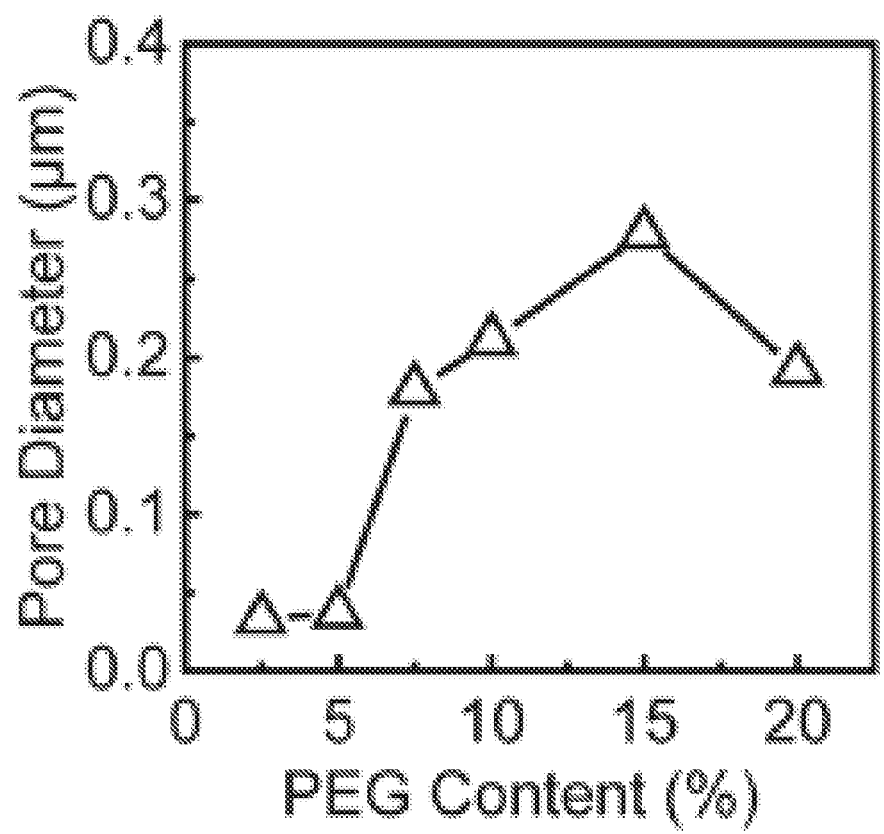
FIG. 12 is a graph of average pore diameter of the PSAP beads of FIG. 9.

As shown in FIG. 11, the porosity of the PSAP beads increases with the increased PEG content and can reach up to 60%. Meanwhile, the pore size of the beads has a significant increase as the PEG content is higher than 5 wt % (FIG. 12), which is consistent with the change of the polymer morphology (FIG. 9). When the PEG content is 7.5 to 15 wt %, the average pore diameter based on MIP is ~0.15 to 0.3 μm. In addition, there is a slight decrease in the average pore diameter at 20 wt % of PEG, which may be caused by the uneven distribution of pore size and the existence of numerous small pores inside the polymer network (FIG. 9).

The pore structure estimated by MIP only provides information concerning a dry polymer in the unswollen state, but not at the conditions in which it usually works. Since the PSAP beads can swell in water and become hydrated, the pore size will become larger as the polymer chains relax and absorb water. The swelling process of the PSAP beads in the saline medium (0.9% NaCl in DI water) was monitored to determine both swelling kinetics and equilibrium swelling capacity.

Figure 13B:
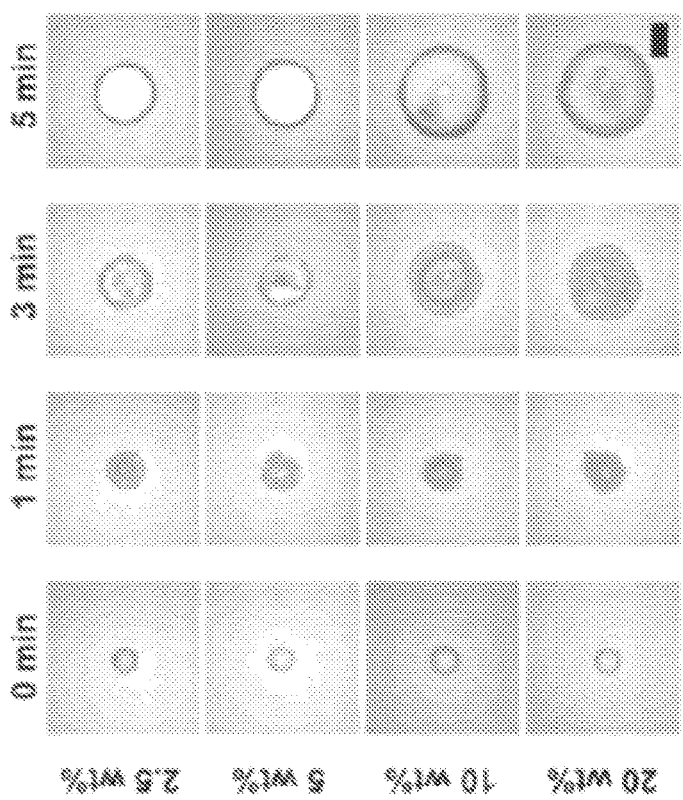
FIGS. 13A-B illustrate swelling behavior of the PSAP beads in the saline.
Figure 13A:
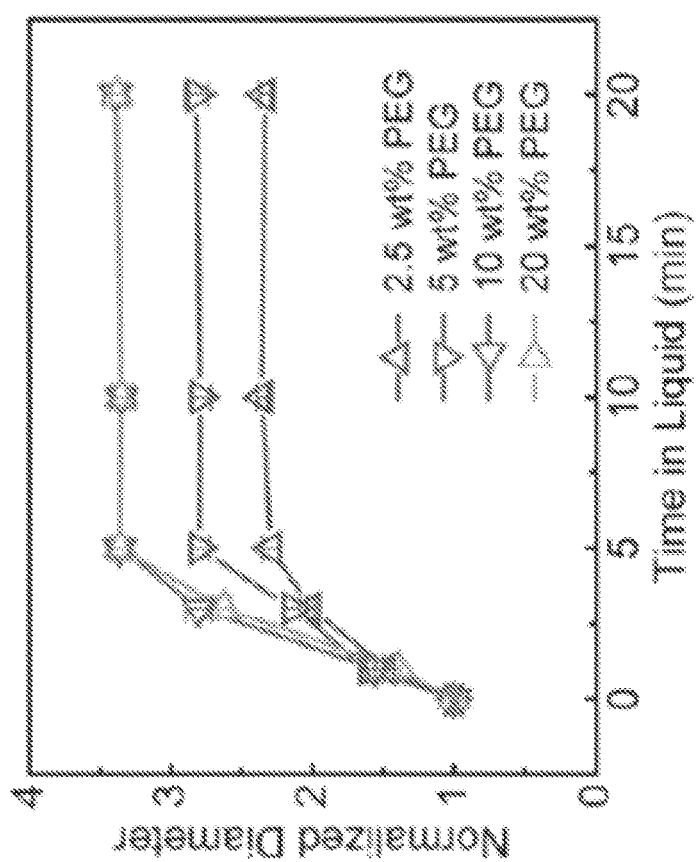
Figure 14:
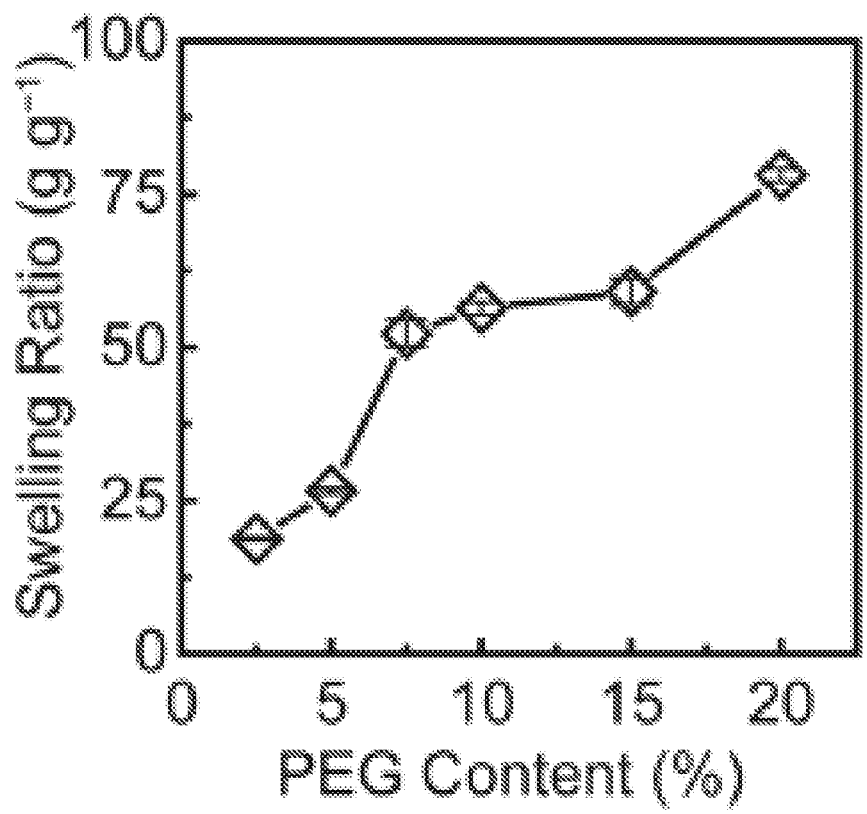
FIG. 14 is a graph of swelling ratio of the PSAP beads in the saline (0.9% sodium chloride (NaCl) solution) of FIG. 9.

The results of normalized bead diameters versus time indicate that the beads with different pore structures can all reach their maximum swelling capacity within 5 minutes in the saline (FIGS. 13A, 13B). The weight swelling ratio of the PSAP beads in the saline was measured to simulate the size expansion of the pores in biofluid media. It can be seen from the swelling ratio data in FIG. 14 that the equilibrium swelling capacity increases as the PEG content increases. The swelling ratio is less than 30 g/g with a low PEG content (less than 5 wt %) since a rigid polymer network and high mechanical strength cause difficulty in water diffusion inside the beads. When the PEG content is 7.5 to 15 wt %, the swelling ratio of the beads increases significantly and reaches ~50 to 60 g/g because a high porosity can promote relaxation and disentanglement of the polymer chains. As the PEG content is further increased to 20 wt %, the swelling capacity can be as high as ~80 g/g due to the contribution of large cavities inside the beads (FIG. 9).

In addition, the as-prepared PSAP beads have a uniform size and a stable swelling capacity with the same precursor composition (FIGS. 15A-15B). For example, when the PEG content is 10 wt %, a single dry bead has an average weight of 1.6 mg (weight variation <7%), and a hydrated bead has an average weight of 96.1 mg (weight variation <4%). Thus, if applying the PSAP beads for liquid sample collection, it is easy to aliquot the potential-target-containing liquid into the beads spontaneously and simultaneously.

For biofluid specimens, aliquoting a specimen into several measured portions for either parallel or different tests is common and necessary for practical applications. The self-aliquoting function of the PSAP beads allows a simple way to divide the liquid sample collected by the beads into equal parts for multiple tests, respectively. Meanwhile, since each bead has a constant and precise swelling ratio, without pipetting or weighing it, the sample volume or weight can be calculated for quantitative analysis by directly counting the bead quantity.

The size screening effect for target species during the self-driven microfiltration treatment depends on both the pore structure and swelling capacity of the PSAP beads. When a PSAP bead swells with liquid samples, the liquid penetrates the pore interior initially and causes swelling of the surface layer of the polymer, which in turn leads to complete pore filling. Upon swelling, the relaxed polymer chains form a framework and the pores inside construct interconnected water channels filled by water molecules together with small target species. The relative size of the resulting water channels is a critical parameter for the size screening of the prospective target species. Only the target species with a size smaller than the swollen water channels can be effectively captured by the bead, while larger target species are excluded outside and thus removed. This critical size is determined primarily by the pore structure of the polymer. According to the needs of microfiltration, the PSAP beads should effectively absorb target species less than 0.5 µm while excluding any target species larger than 1 µm. A decrease in the average pore diameter of the beads should reduce the size of the water channels, which will result in a more effective exclusion of undesired large components. However, as the water channel dimensions decrease, the swelling capacity of the PSAP beads decreases, and the mechanical strength of the hydrated beads increases, which may cause difficulties in subsequent recovery of small species absorbed by the beads.

Figure 16:
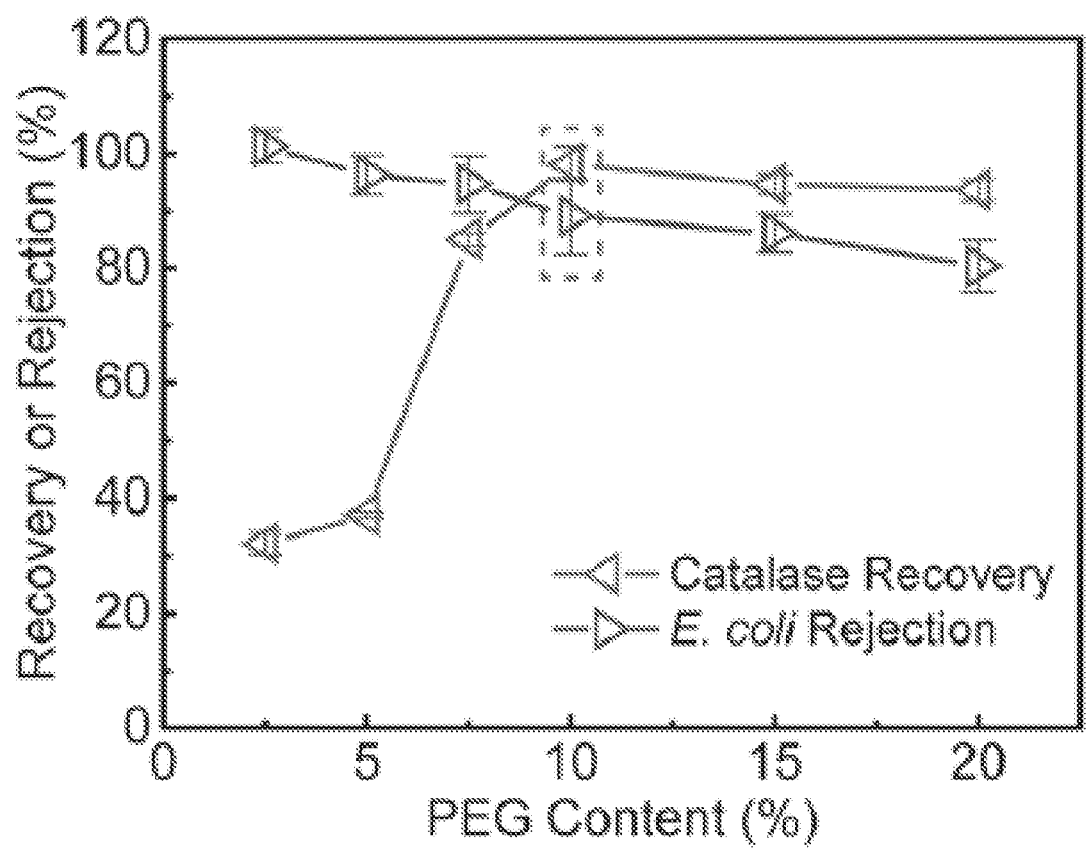

To investigate the critical channel size experimentally, as illustrated in FIGS. 8A-8B, the PSAP beads prepared with different PEG contents were applied to treat a saline medium containing catalase (a common enzyme in the human body with a size of ~10 nm) or $E. coli$ (a Gram-negative bacterium with a size of 1-2 µm). FIG. 16 presents the recovery efficiency for catalase and the rejection efficiency for $E. coli$ after the microfiltration treatment.

For the PSAP beads prepared with a PEG content of 2.5 to 5 wt %, the recovery efficiency for catalase is less than 40%, although the characterization results of these beads indicate that they should be able to absorb such small analytical targets. The reason for this is probably that the beads with a low PEG content present a rigid polymer framework together with a relatively high mechanical strength, which makes it challenging to break the hydrated beads and release the catalase captured without affecting its enzymatic activity. As the PEG content is increased to 7.5 wt %, the catalase recovery significantly increases to ~85% due to a flexible porous structure and a high swelling capacity of the PSAP beads. When the PEG content is 10 to 20 wt %, the recovery efficiency for catalase remains at a high level (>90%), which suggests the recovery of small target species is not affected by the pore structure after the pore size reaches a certain threshold. For the exclusion of bacteria, the results shown in FIG. 16 indicate superior exclusion performance of the PSAP beads for $E. coli$. In a present method, the surface-attached $E. coli$ cells on the beads after the treatment are not included in the excluded cells for rejection efficiency calculation. Under this definition, a complete exclusion (100% $E. coli$ rejection) can be realized by the PSAP beads with 2.5 wt % of PEG.

As the PEG content increases, the rejection efficiency slightly decreases since more bacteria attach to the enlarged water channels and thus remain on the bead surface after the treatment. Nevertheless, it can still achieve higher than 80% $E. coli$ rejection even at a PEG content of 20 wt %. On the basis of the design criteria, an optimal porous network should achieve both a high recovery efficiency for small target species and a high rejection efficiency for undesired large components. Therefore, the PSAP beads with 10 wt % of PEG were selected and applied for further demonstration in biofluid sample treatment due to their optimized pore structure and excellent swelling properties.

Figure 17:
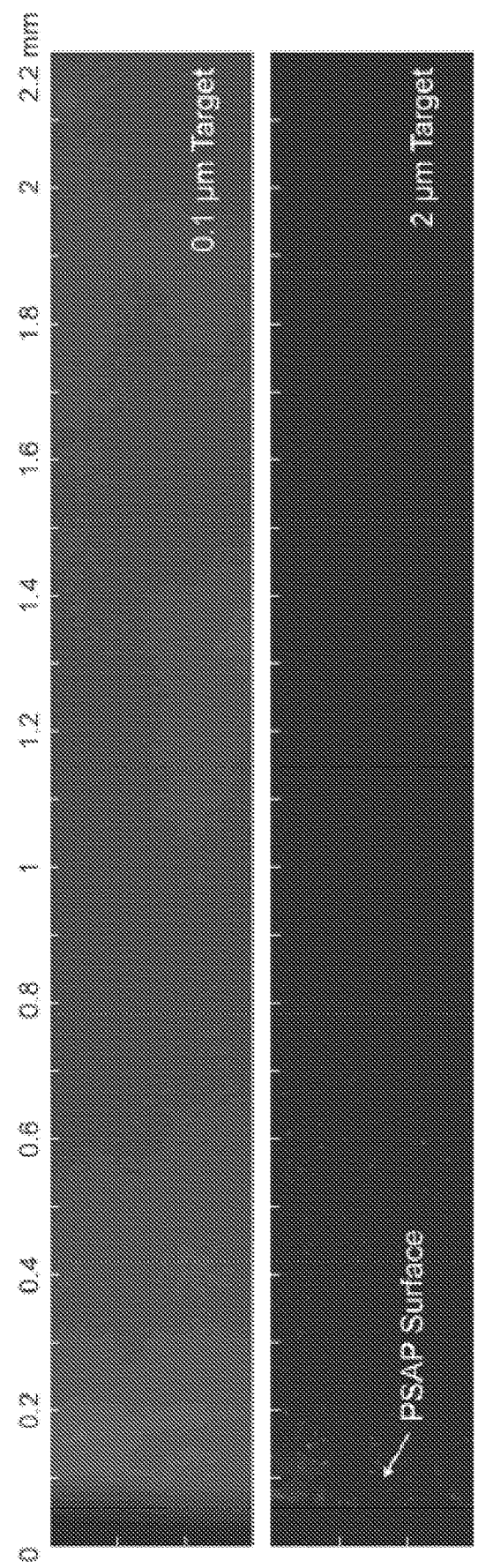

The fluorescent latex microspheres (0.1 µm or 2 µm in diameter, representing small or large target species) were used as standard target species to observe and visualize the distribution of target species on the bead surface or inside the beads after the microfiltration treatment. FIG. 17 shows the two-dimensional mapping images of the fluorescent analytical targets on the cross-section of the beads by fluorescence microscopy.

Figure 18A:
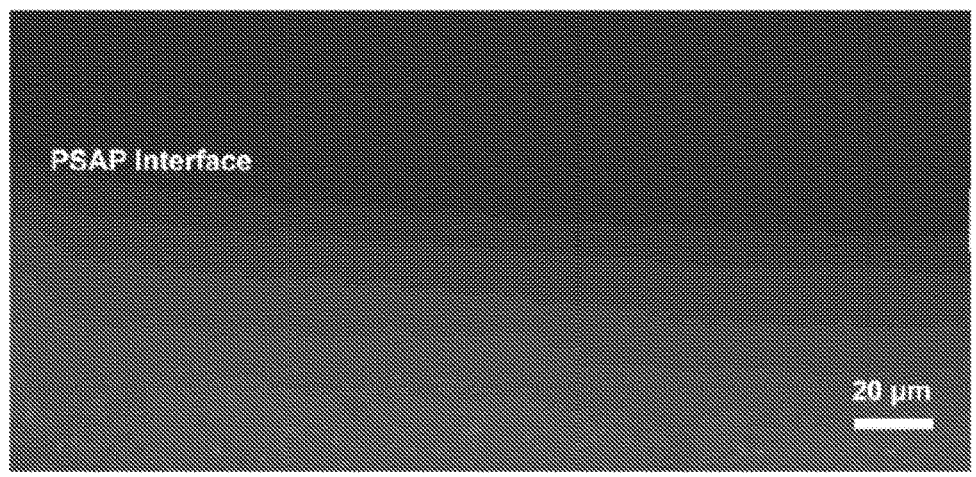
FIGS. 18A-18B shows the distribution of fluorescent microspheres near the edge of the PSAP beads after the microfiltration treatment.
Figure 18B:
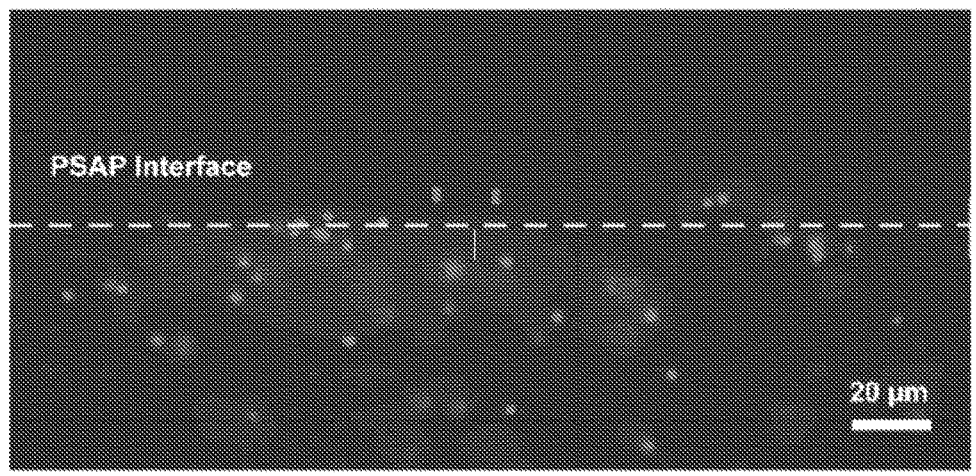
Figure 19:
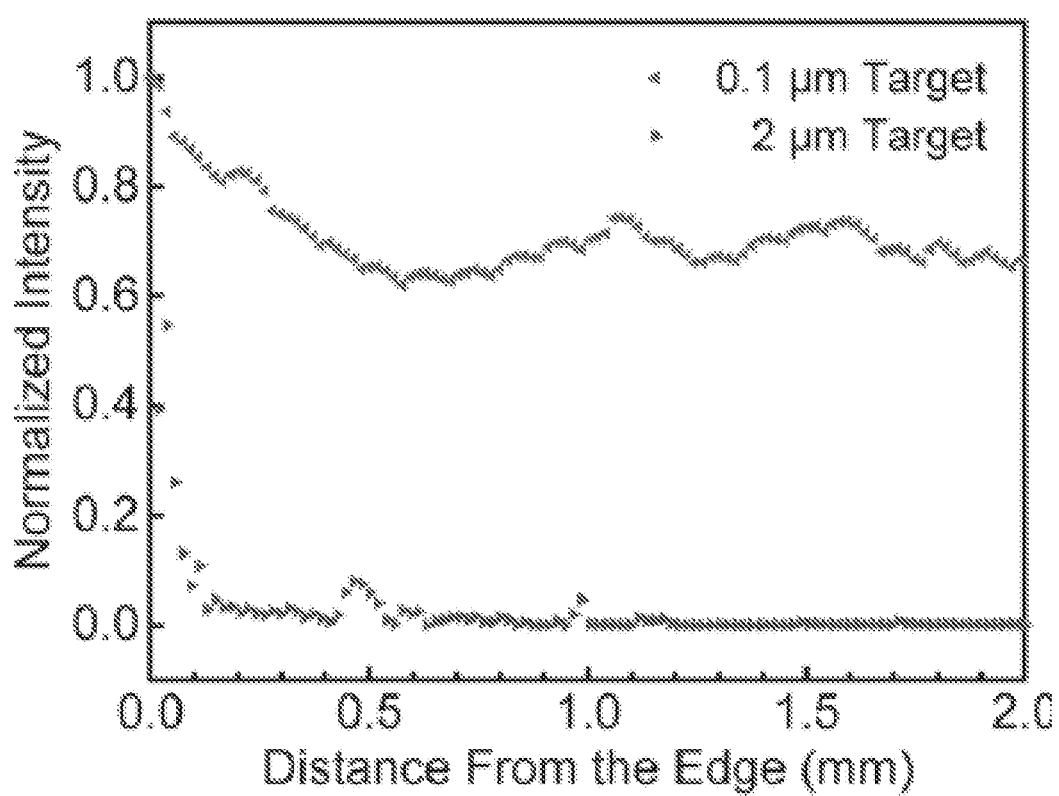

The mapping results detecting the microspheres collected by the beads are in accordance with the results from catalase and $E. coli$ treatment (FIG. 16). For 0.1 µm microspheres, the fluorescence signals distribute uniformly on the cross-section of the bead, and a slight aggregation phenomenon only appears on the edge (FIG. 17 and details in FIGS. 18A-18B). On the other hand, for 2 µm microspheres, most of the microspheres are excluded outside the bead, while only a few microspheres are attached to the surface (FIG. 17 and details in FIGS. 18A-18B). FIG. 19 illustrates the intensity analysis of the fluorescent analytical targets on the cross-section of the beads. The fluorescence intensity of small microspheres remains at a stable range from the near-surface to the core of the bead, while the intensity of large microspheres dramatically drops to near zero at a distance of 0.2 mm from the edge.

Some small peaks of the fluorescence signal (e.g., at ~0.5 mm and ~1.0 mm away from the edge) are probably caused by contamination during the sample preparation. The results indicate that, although a few "large" target species may be left on the bead surface after the treatment, these undesired components are restricted to the surface area and cannot enter the bead or transfer inside the pores. Thus, the analytical targets captured by the beads will not be affected by these undesired components.

Figure 20:
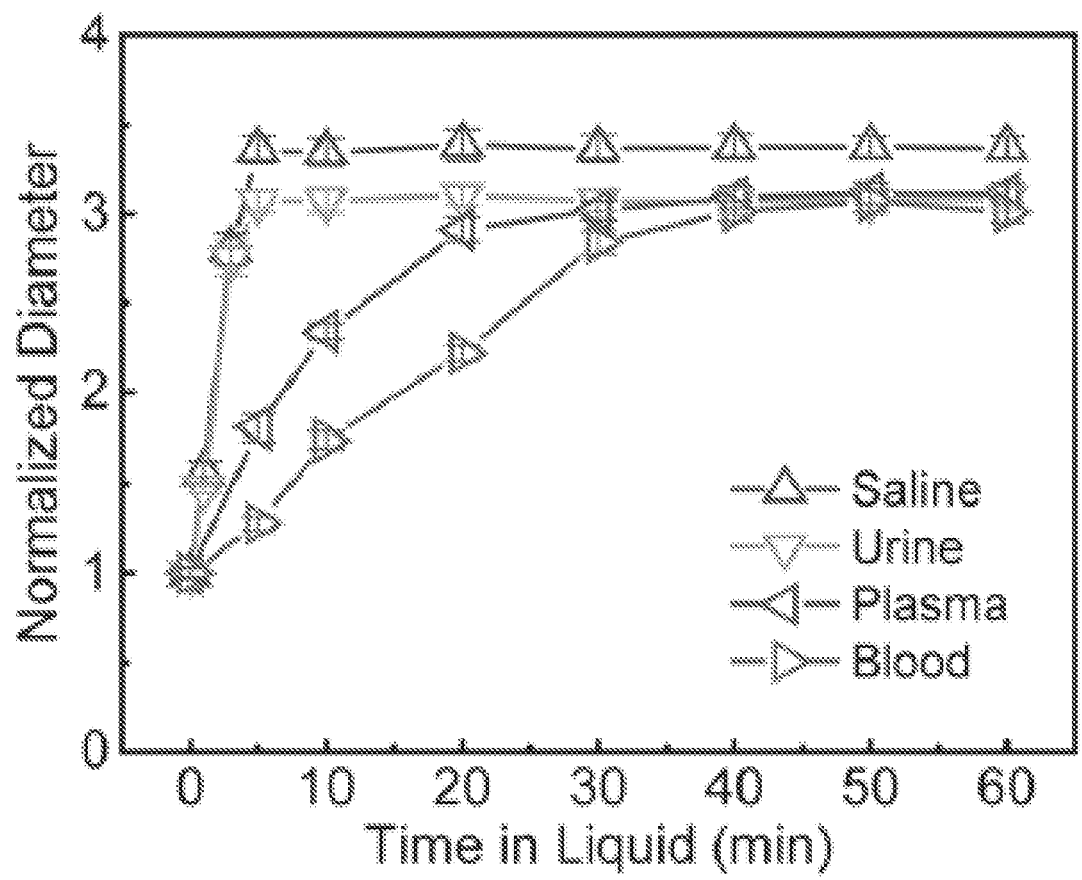
Figure 21:
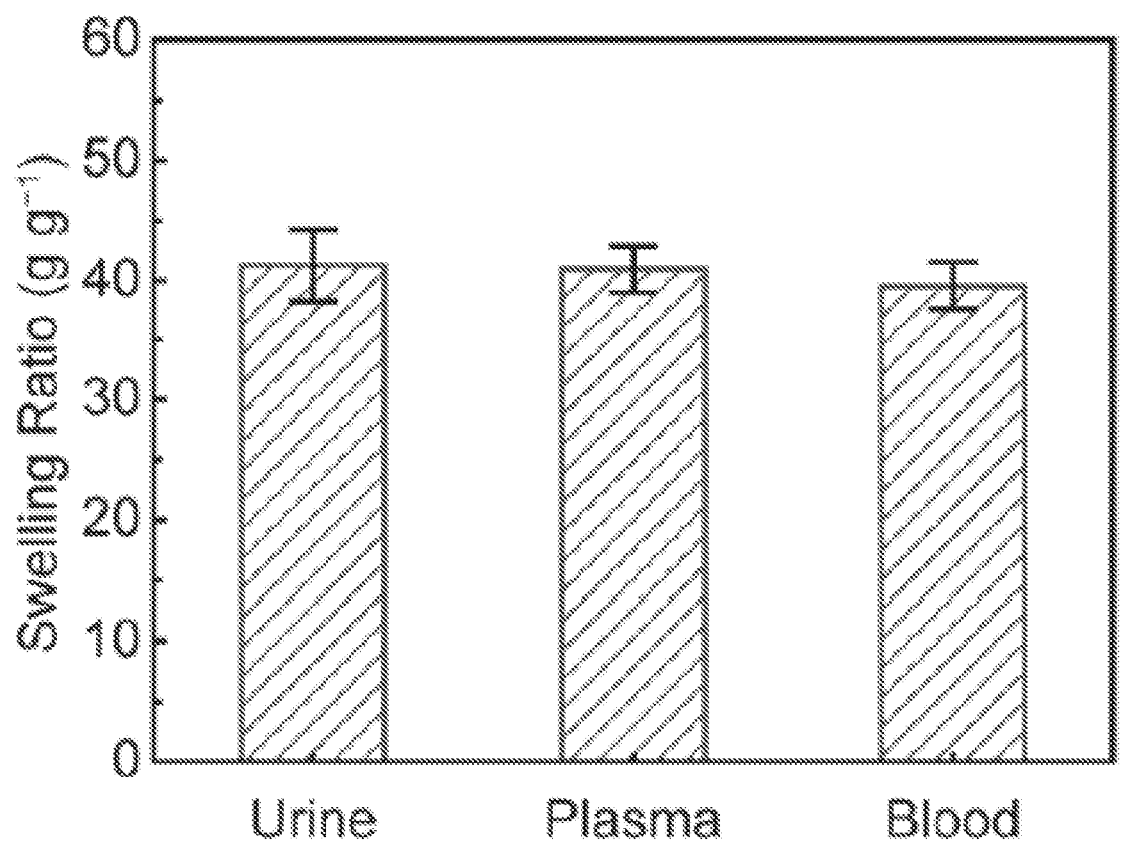
Figure 22:
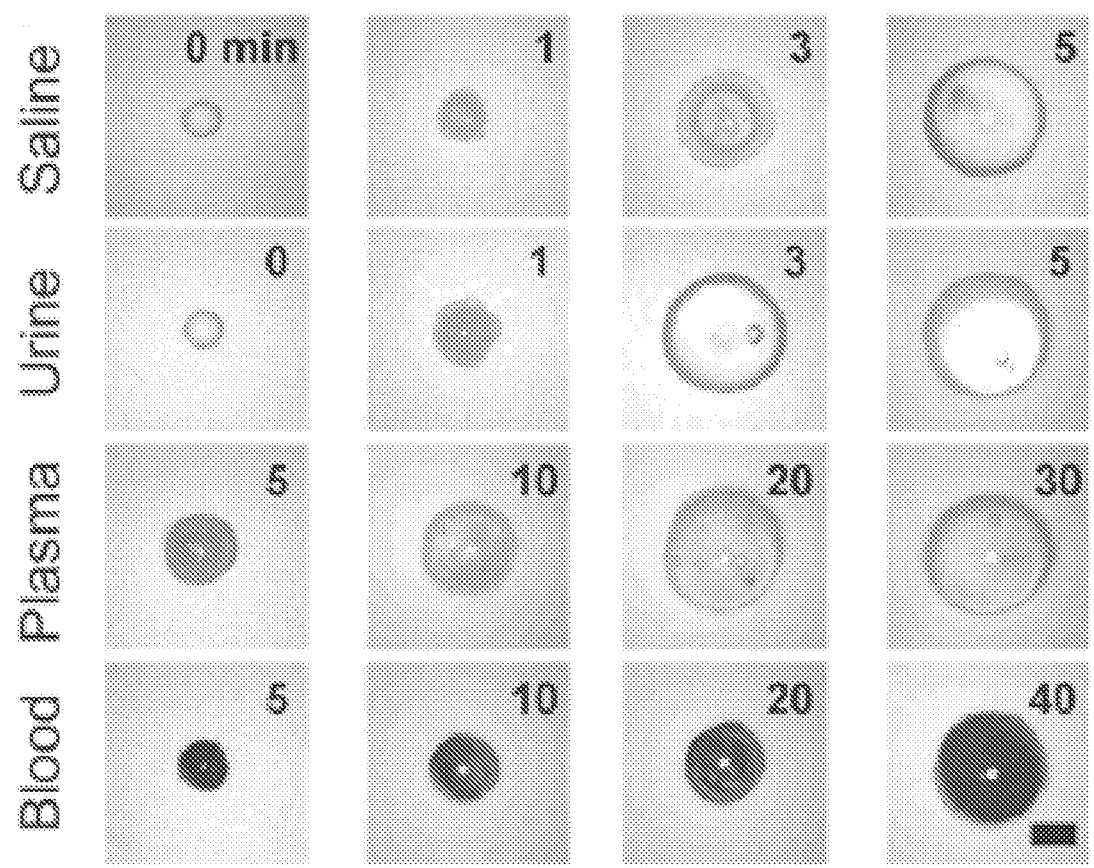

A biofluid medium such as urine, blood plasma, or whole blood may contain organic compounds, macromolecules, or even live cells, which make it a highly complex system compared with the simple saline. To demonstrate the effectiveness of the present PSAP beads for biofluid treatment, the swelling process of the beads in biofluid media, including synthetic urine, bovine plasma, and bovine blood, was investigated (FIG. 20). The results show that the present PSAP beads can achieve a rapid expansion within 5 minutes in the synthetic urine. Meanwhile, for colloids like bovine plasma and blood, it takes a longer time for the PSAP beads to reach the swelling equilibrium (30-40 minutes). The relatively slow swelling process may be caused by the plasma proteins and blood cells, which probably impede the wetting of the bead surface or even block water channels, thus retarding the pore filling process. Although the swelling kinetics is affected by the medium permeability, the swelling ratio of the beads is almost the same for all three biofluid media (40-41 g/g) due to their similar osmolarity (FIG. 21). The optical images of the beads show the uniform expansion of the PSAP during the swelling despite the medium properties (FIG. 22).

Figure 23:
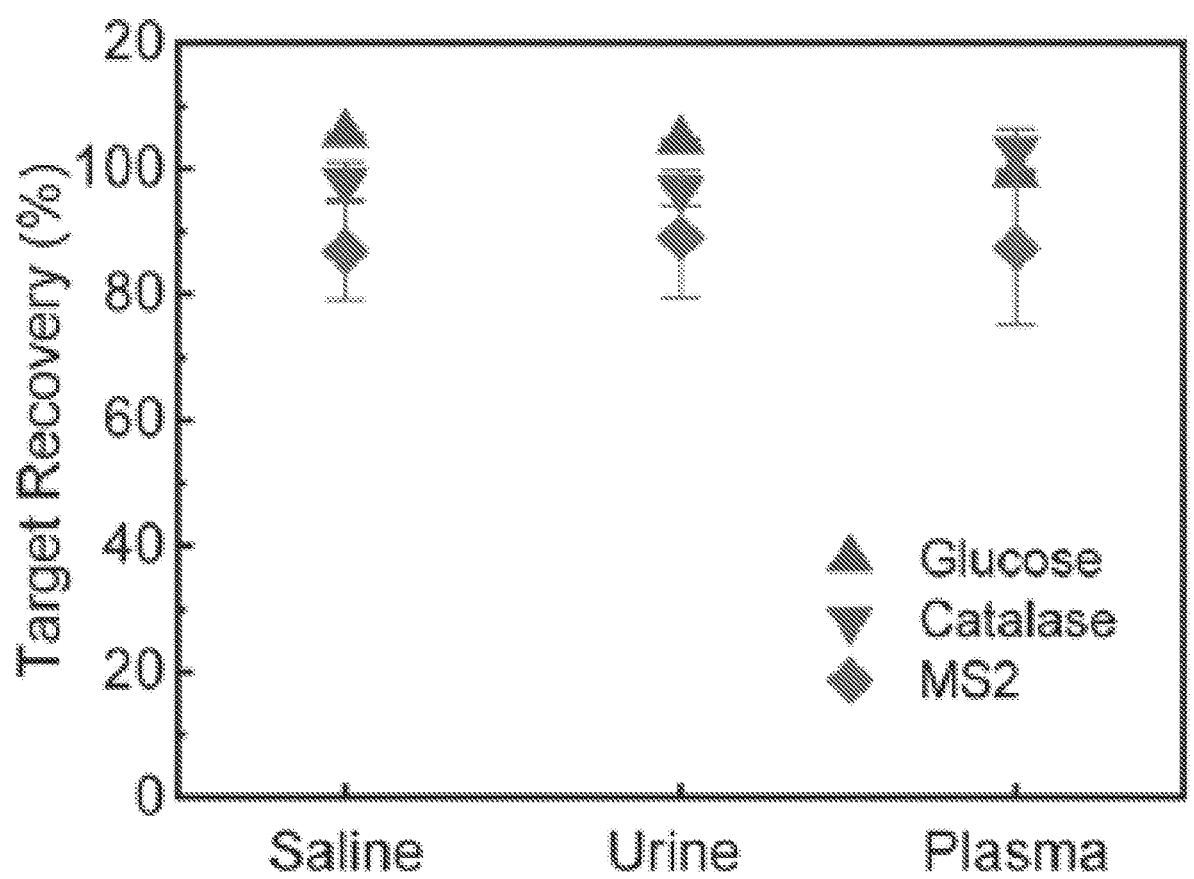

To evaluate microfiltration performance, biofluid samples dosed with sugars (e.g., glucose), enzymes (e.g., catalase), or human virus surrogates (e.g., bacteriophage MS2) were treated by the PSAP beads. FIG. 23 presents recovery efficiency for each target species in the saline, synthetic urine, or bovine plasma medium. For glucose and catalase, it shows close to 100% recovery in all three media. For bacteriophage MS2 (~27 nm), the recovery efficiency shows a slight drop but remains above 85% in either fluid medium. A possible explanation for this might be that the ultrasonication process to release MS2 from the beads may cause minor damages to the viruses, but the double-layer-plating method only detects live viruses for recovery efficiency analysis and has a comparatively high method error.

Figure 24:
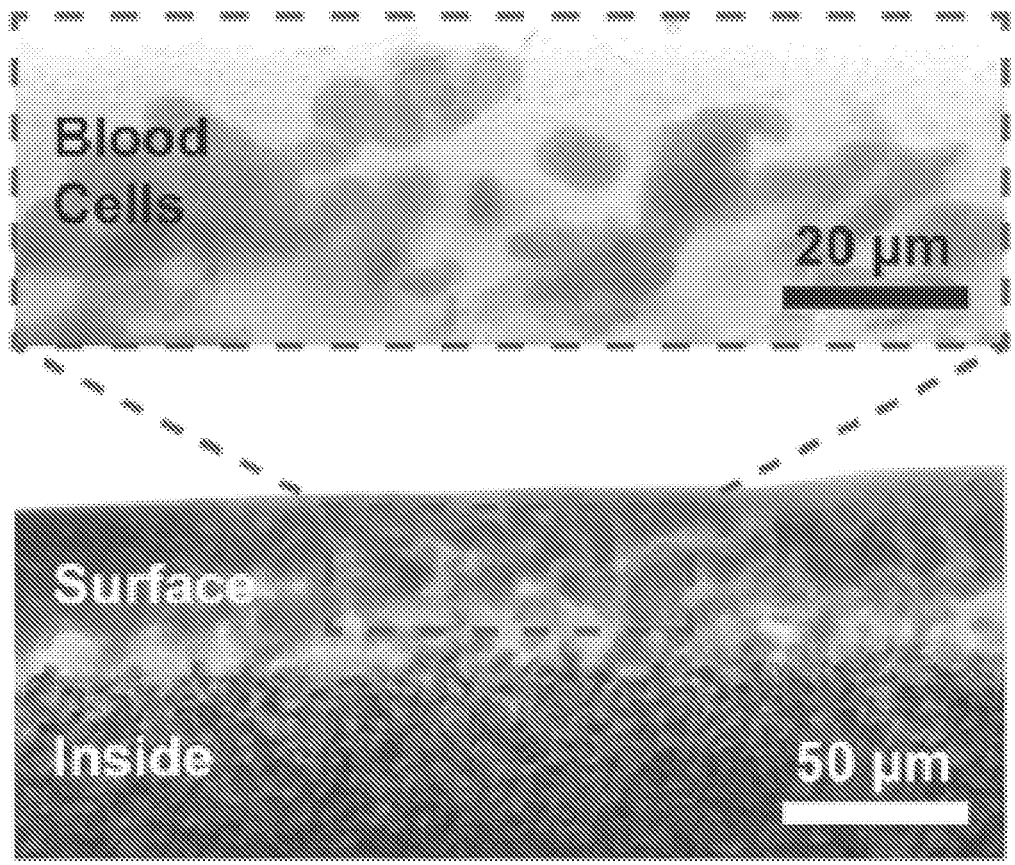

Overall, these findings, while preliminary, suggest that the PSAP beads can be potentially used to collect biomarkers from human biofluid samples for practical medical diagnosis. Turning to the most complicated medium (i.e., blood), although the beads after the microfiltration treatment become dark red (FIG. 22), the microscopy images in FIG. 24 show that blood cells are blocked outside the bead due to their large size (~6-8 m for red blood cells and ~12-15 m for white blood cells). Quantitative analysis shows that only ~12% of red blood cells remain on the bead surface after the treatment, while ~88% of the cells are excluded and removed from the beads.

This result indicates that the self-driven microfiltration enabled by the PSAP beads can achieve effective separation between blood cells and plasma without centrifugation. Since blood cells approximately account for half the volume/weight of a blood sample, the microfiltration treatment can easily reduce the sample volume by efficiently removing blood cells at the point of collection and halve the transportation load. Simultaneously, as the blood cells are separated from the potential-target-containing plasma in the hydrated PSAP beads, the hemolysis of the blood cells afterward will not affect the target species stored inside the beads.

Previous studies have reported the adverse effects of improper storage conditions on the shelf life of analytical targets due to microbial activities. The shelf life extension ability of the PSAP beads against bacterial contamination was evaluated by using the saline medium containing the analytical target, catalase, together with Gram-positive bacteria, *B. subtilis*. As a widely used model organism for secreted enzyme production, *B. subtilis* is able to generate extracellular and membrane-bound proteases, which can cleave the peptide bonds within polypeptides or proteins by hydrolysis.

Figure 25:
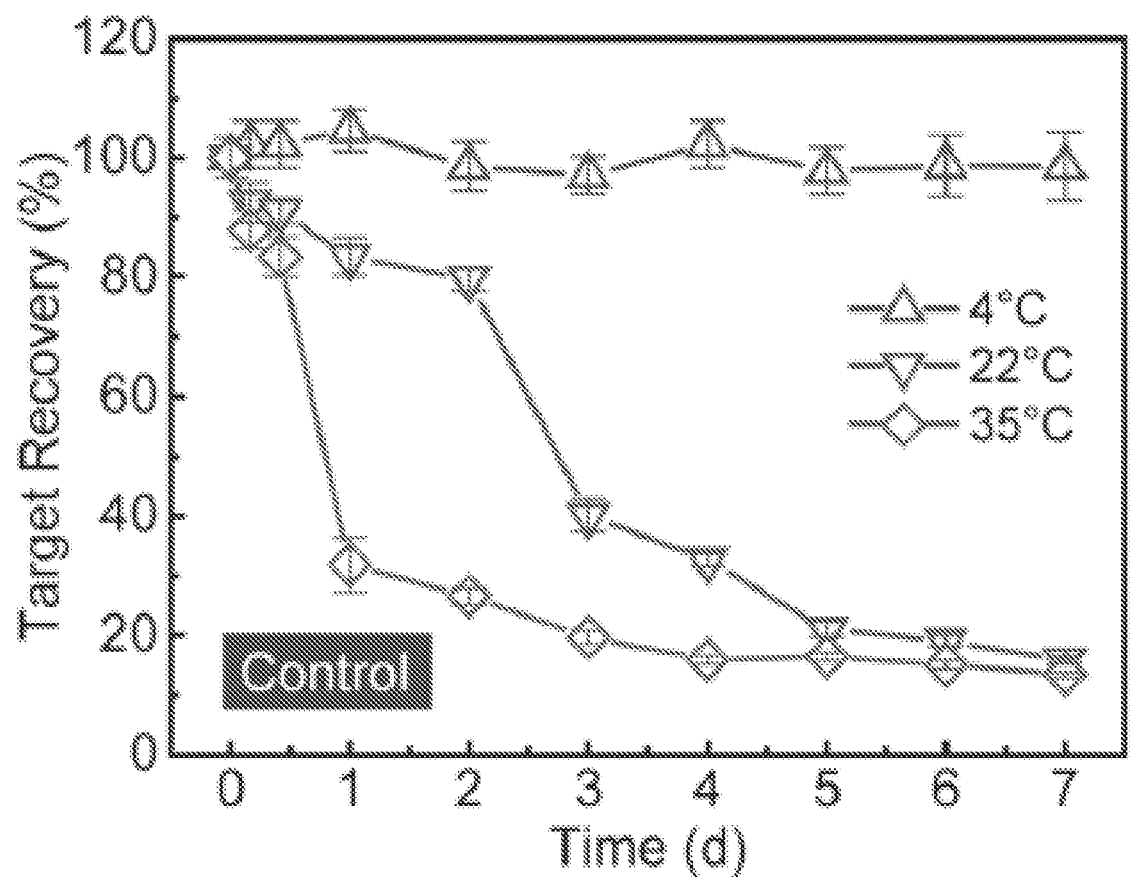
FIGS. 25-28 illustrate shelf life extension of catalase by the microfiltration treatment against bacterial contamination.

After the micro-filtration treatment, the enzymatic activities of catalase in the liquid control and the hydrated PSAP beads were monitored for 7 days at three different temperatures (4-35° C.). As shown in FIG. 25, with a small dosage of bacteria initially (~50 CFU/mL), the liquid sample loses ~70% of catalase activity rapidly within only 1 day at 35° C. At room temperature (22±1° C.), the degradation of catalase in the control group is slower due to slower bacterial growth and thus less protease production, but it still loses ~60% of activity gradually after 3 days.

The reason that the catalase activity affected by bacterial degradation does not fall to zero is that *B. subtilis* itself as a catalase-positive bacterium can produce catalase automatically. Therefore, while the initially added catalase is consumed, the catalase provided by the *B. subtilis* contributes to the total enzymatic activity, which is not negligible at a high bacterial concentration, but the determination of the shelf life is not affected. In the meantime, the liquid sample stored at 4° C. maintains a stable activity because the refrigeration effectively inhibits the bacterial growth (FIG. 8B). Interestingly, there is a lag time in the correlation between the bacterial concentration and the remaining catalase activity.

Figure 26:
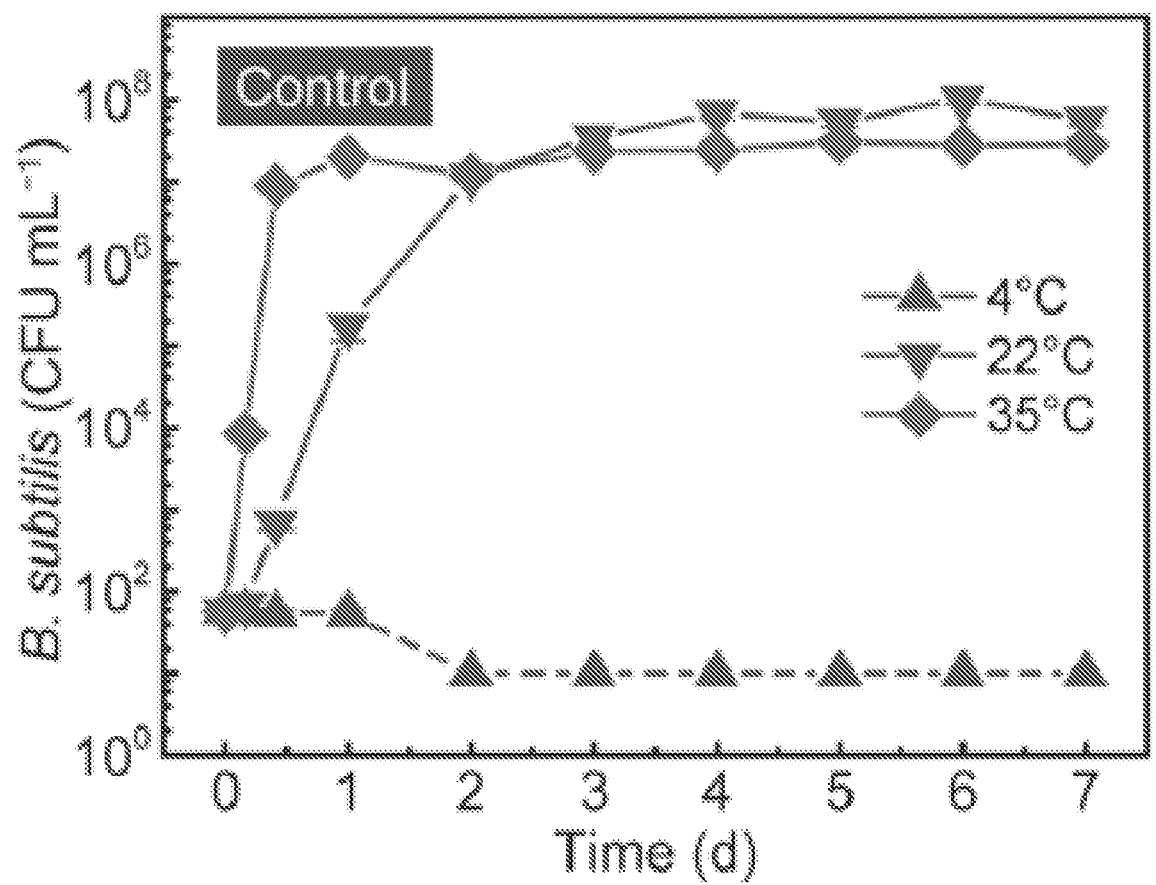

It takes 12 hours at 35° C. or 2 days at 22° C. for the bacteria to reproduce to a concentration level of 107 CFU/mL, but the dramatic drop in the catalase activity happens after 1 and 3 days at 35° C. and 22° C., respectively (FIGS. 25-26). This result may be explained by the fact that only after the bacterial concentration reaches a certain level, does the hydrolysis of catalase start to speed up with the help of enough protease, and the hydrolysis rate is also affected by temperature.

Figure 27:
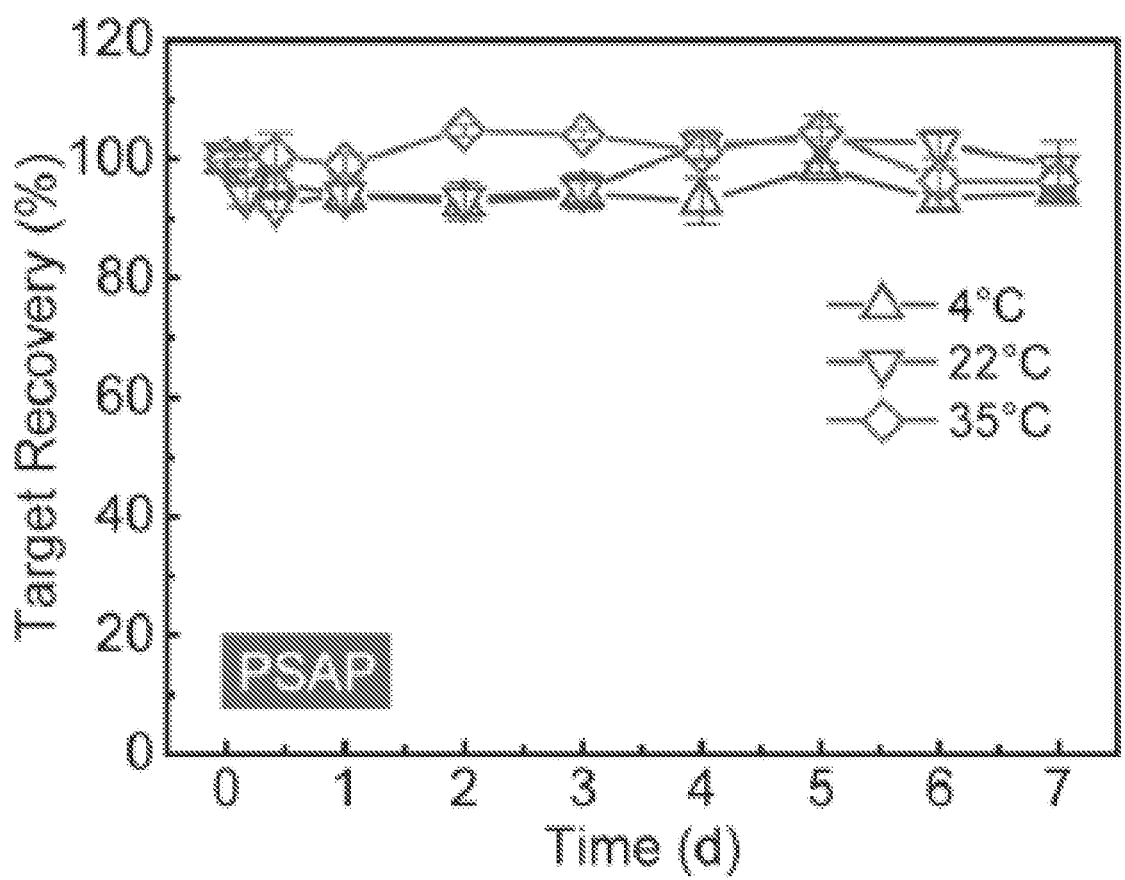
Figure 28:
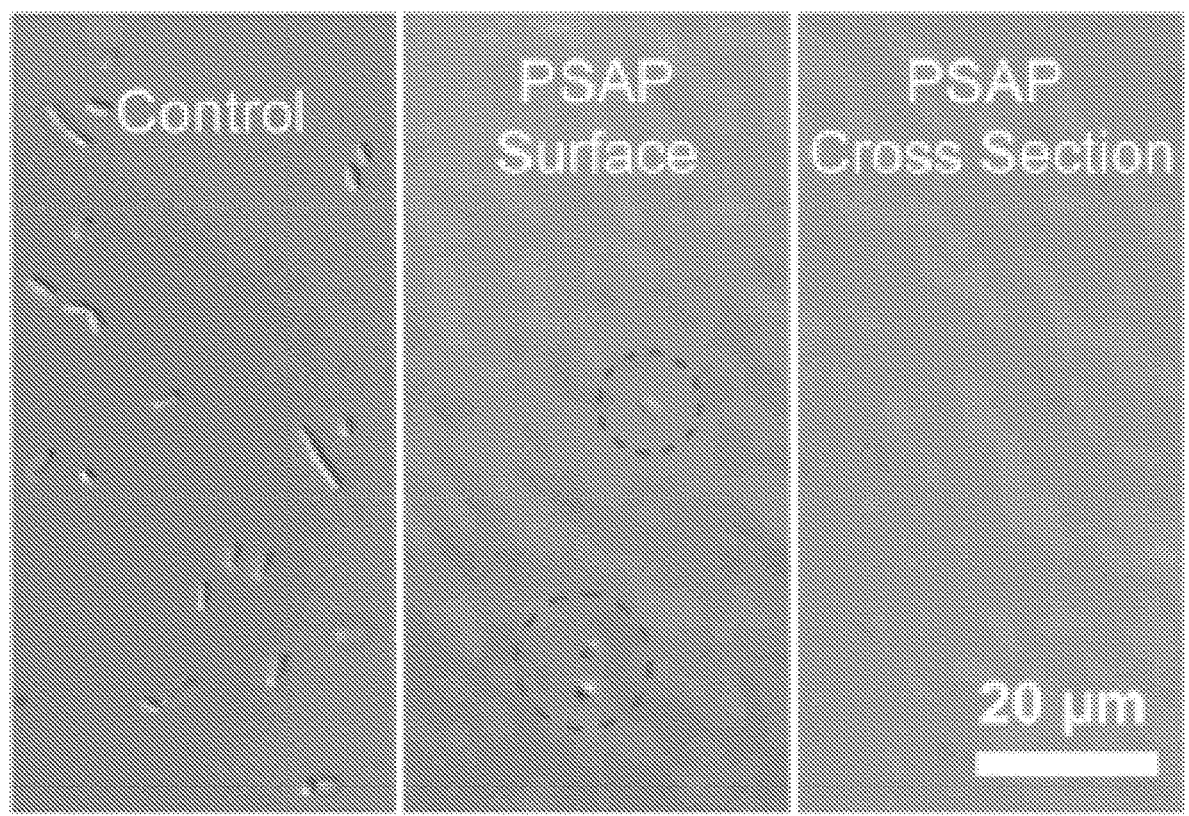

In contrast to the control groups, the catalase stored inside the PSAP beads remains higher than 90% of activity even after 7 days despite the temperature change (FIG. 27). As previously demonstrated, the PSAP beads can efficiently exclude bacterial cells during the microfiltration process, thus avoiding bacterial contamination on target species and effectively achieving extension of shelf life as with refrigeration storage. The microscopy images in FIG. 28 show that although a few bacteria are left on the bead surface after the treatment, as expected, they cannot enter the bead even after 7 days at 35° C. due to the size limitation of the water channels.

Figure 29:
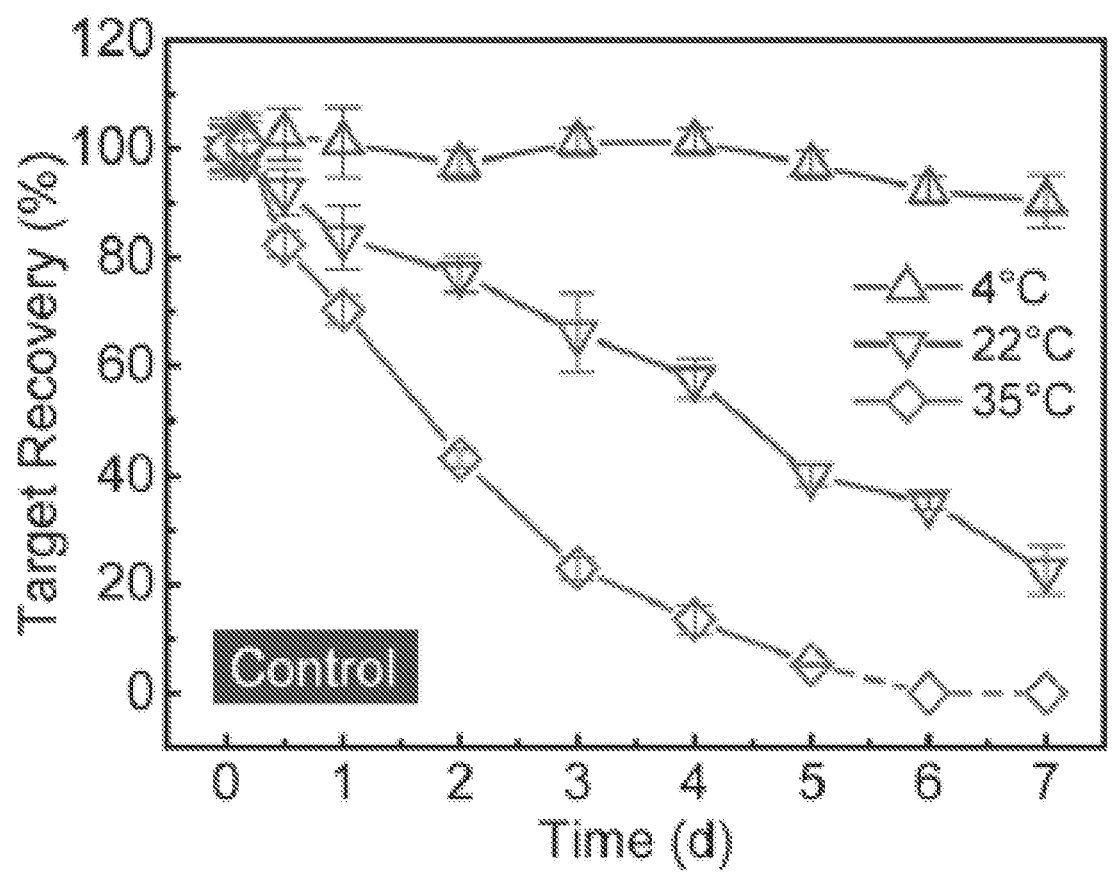

To investigate the impacts of medium properties on the analytical target shelf life, a storage study was performed to examine the stability behavior of catalase across time in a bovine plasma medium. Unlike in the saline medium, catalase is not stable in the plasma medium even without the addition of bacteria (FIG. 29). In the control groups, the plasma sample loses ~60% of catalase activity within 2 days, and almost complete degradation happens after 5 days at 35° C. If the storage temperature decreases, the reduction of catalase activity slows down. However, it still loses ~50% of catalase activity within 4 days, and only ~20% of catalase activity remains after 7 days at 22° C. Even a low temperature such as 4° C. cannot entirely prevent the target species from inactivation, and it shows a slight decrease in catalase activity after 7 days of storage.

Figure 30:
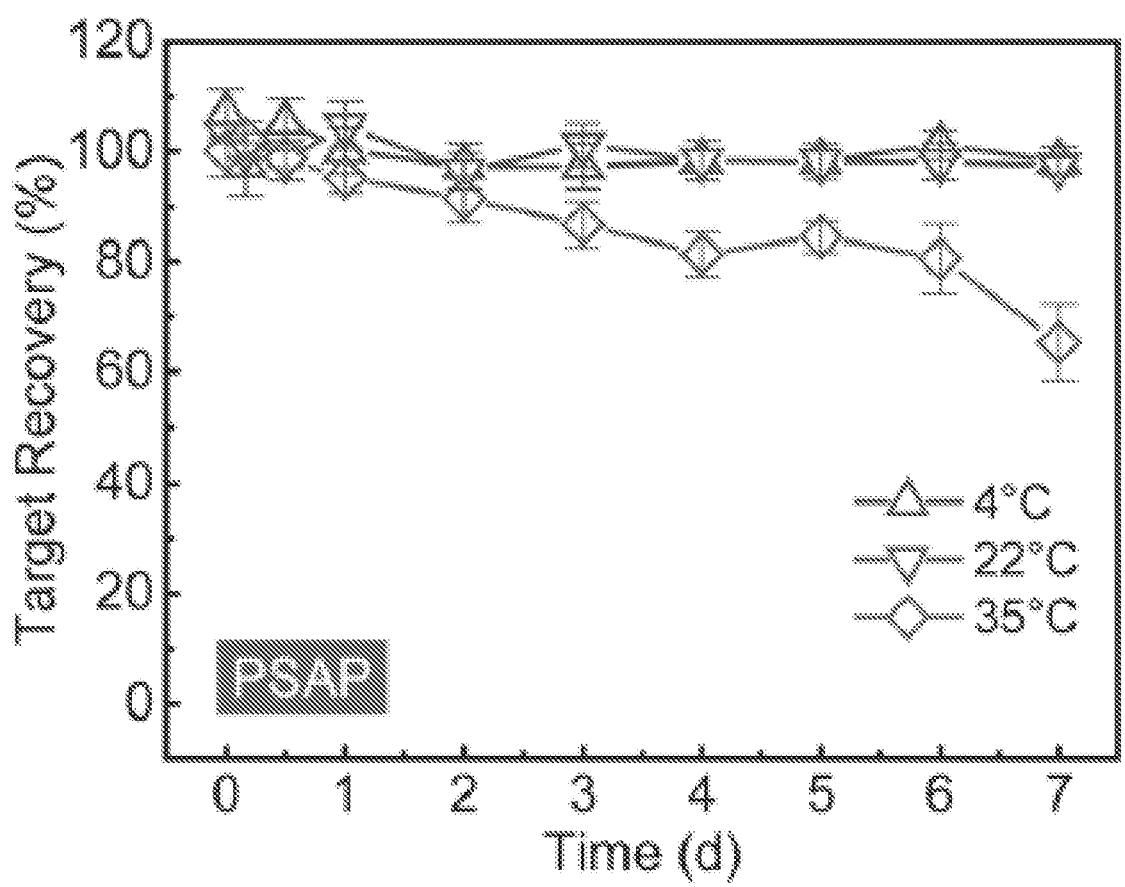

The inactivation of catalase may be caused by aggregations or interactions between catalase with components in the bovine plasma such as serum albumins, globulins, and fibrinogen. In contrast, the PSAP beads have been demonstrated to effectively extend the shelf life of catalase in the plasma medium. As shown in FIG. 30, the catalase stored inside the beads remains at higher than 90% activity at 22° C. or below even after 7 days. If the storage temperature is elevated to 35° C., the normalized catalase activity decreases to ~90% after 2 days, then keeps at 80% for 4 days, and eventually reduces to ~65% after 7 days of storage.

Although the inactivation mechanism for catalase in the plasma has not been investigated yet, a possible explanation for the shelf life extension in the PSAP beads might be that the substance transportation and diffusion are limited in the water channels inside the bead, thus the lower contact probability of target species with other plasma components results in a lower inactivation. But once the temperature is higher than a critical level, with accelerated molecular mobility, the polymer network will gradually lose its function as a physical barrier and cannot protect prospective target species from potential inactivation. To further extend the shelf life of analytical targets in the PSAP beads, synthetic, integration, and post-treatment strategies can be applied to inhibit or reduce the analytical target degradation or inactivation (e.g., preload stabilizers in the beads, or dry the beads together with analytical targets).

The present well-designed and scalable PSAP beads are beneficial for biofluid specimen processing and storage. The PSAP beads can achieve fast and effective microfiltration among target species of different sizes. The key to the success of this microfiltration treatment is the pore structure control and swelling capacity improvement of the PSAP beads. Based on the rational design, centrifuge-free separation, pipet-free aliquoting, and refrigeration-free storage of biofluid samples using the PSAP beads was demonstrated. It takes only 5 minutes for the beads prepared with 10 wt % PEG to exclude ~90% of bacteria in the saline or 40 minutes for these beads to exclude >80% of red blood cells in the blood.

Since the synthesized beads have uniform size and constant swelling ability, the biofluid together with prospective target species is aliquoted into each bead spontaneously and simultaneously. The timely removal of blood cells from potential-target-containing plasma eliminated the adverse impacts caused by in vitro hemolysis during sample storage and transportation. In addition, removing blood cells from the samples significantly reduces sample volume/weight and decreases the transport burden. Meanwhile, the microbial spoilage and the influence of microbial activities on the shelf life of target species are avoided even at an evaluated temperature after the micro-filtration treatment. Due to the limitation of mass transportation and diffusion in the hydrated PSAP beads, inactivation or degradation of sensitive target species is slowed down, leading to further extended shelf life. Although the microfiltration for biofluid specimen processing and storage remains to be investigated under varying conditions, the reported results show that the PSAP beads can potentially provide an alternative method for point-of-use biofluid stabilization in resource-limited settings.

While certain embodiments of the disclosed technology have been described in connection with what is presently considered to be the most practical embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   Introducing a specimen comprising a carrier and components to a storage media; and
   Releasing at least a portion of a first target from the storage media;
   Wherein:
      At least a portion of the components of the specimen comprise a first target;
      The storage media is configured to capture at least a portion of the first target; and
      The storage media is tunable, comprises a superabsorbent polymer, and has a selective absorption profile configured:
         To capture components having a size less than a capture size of approximately 0.5 µm; and
         To exclude components having a size greater than a non-capture size of approximately 1.0 µm.

2. The method of claim 1, wherein at least one of:
the introducing comprises storing at least a portion of the carrier and the first target in the storage media;
the storage media has a swelling capacity profile configured to absorb and capture the first target and the carrier;
the first target has a size less than the capture size; or
the introducing comprises self-driven filtering of the specimen in the storage media resulting in the absorption and capture of the first target and the carrier in the storage media.

3. The method of claim 1 further comprising:
removing unstored specimen from proximity of the storage media.

4. The method of claim 1, wherein at least one of:
the specimen comprises a biofluid;
the storage media comprises porous superabsorbent polymer beads;
the specimen comprises a biofluid, the storage media comprises porous superabsorbent polymer beads, and the porous superabsorbent polymer beads have a porous structure for the selective absorption of the first target in the biofluid;
the specimen comprises a biofluid, the storage media comprises porous superabsorbent polymer beads, and the porous superabsorbent polymer beads have a swelling capacity profile to capture the biofluid together with first target inside the beads of the porous superabsorbent polymer beads;
the releasing comprises adding water to the storage media that comprises porous superabsorbent polymer beads; or
the releasing comprises adding water to the storage media that comprises porous superabsorbent polymer beads and sonicating the water/porous superabsorbent polymer beads mixture for a time period sufficient to release at least a portion of the first target from the porous superabsorbent polymer beads.

5. The method of claim 1, wherein at least one of:
the components are selected from a group consisting of glucose, catalase, bacteriophage, bacteria, blood cells, and combinations thereof; and wherein or
the first target is selected from the group consisting of glucose, catalase, and bacteriophage.

6. The method of claim 1, wherein:
the first target is a first target species;
introducing comprises storing at least a portion of the carrier and the first target species in the storage media by self-driven filtering of the specimen in the storage media;
the storage media comprises porous superabsorbent polymer beads;
the method further comprises removing unstored specimen from proximity of the porous superabsorbent polymer beads;
the releasing comprises releasing at least a portion of the first target species from the porous superabsorbent polymer beads;

the porous superabsorbent polymer beads have a swelling capacity profile configured to capture and absorb the first target species and the carrier in the porous superabsorbent polymer beads.

7. The method of claim 6, wherein the releasing comprises:
adding water to the porous superabsorbent polymer beads; and
sonicating the water/porous superabsorbent polymer beads mixture for a time period sufficient to release at least a portion of the first target species from the porous superabsorbent polymer beads.

8. The method of claim 7, wherein:
the water is deionized water; and
sonicating is ultrasonicating.

9. The method of claim 1, wherein:
the specimen is a sample;
the first target is a first analytical target;
the storage media comprises porous superabsorbent polymer beads;
the introducing comprises self-aliquoting the sample by introducing the sample to the porous superabsorbent polymer beads that capture at least a portion of the first analytical target; and
the porous superabsorbent polymer beads are tuned in order to enable storage at room temperature of the stored first analytical target in the porous superabsorbent polymer beads.

10. The method of claim 9, wherein the porous superabsorbent polymer beads are further tuned to avoid microbial contamination.

11. The method of claim 9, wherein the porous superabsorbent polymer beads are further tuned to;
present a capture size porosity configured to capture the first analytical target having a size less than or equal to the capture size porosity; and
exclude from capture components of the sample having a size larger than the capture size porosity.

12. The method of claim 11, wherein the porous superabsorbent polymer beads are further tuned to separate plasma from blood cells.

13. The method of claim 9, wherein:
a stored first analytical target is analyzed after storage; and
a length of storage at room temperature is at least 1 day without degradation of the first analytical target to a point that it cannot be analyzed.

14. The method of claim 13, wherein the length of storage is at least 3 days.

15. The method of claim 13, wherein the length of storage is at least 7 days.

16. The method of claim 15, further comprising:
analyzing the stored first analytical target for enzymatic activities.

17. The method of claim 1, wherein:
the specimen is a sample;
the first target is a first analytical target;
the storage media comprises porous superabsorbent polymer beads;
the introducing comprises self-aliquoting the sample by introducing the sample to the porous superabsorbent polymer beads that capture at least a portion of the first analytical target; and
the porous superabsorbent polymer beads are tuned in order to enable testing of a stored first analytical target at a date/time subsequent to the introducing.

18. The method of claim 17, wherein the testing is testing for enzymatic activities of the first analytical target.

19. The method of claim 17, wherein the porous superabsorbent polymer beads have a polyethylene glycol (PEG) content of at least 2.5 wt %.

20. The method of claim 17, wherein the porous superabsorbent polymer beads have a PEG content of between 7.5 wt % and 20 wt %.

21. The method of claim 17, wherein the porous superabsorbent polymer beads have a PEG content of between 10 wt % and 15 wt %.

22. The method of claim 17, wherein the porous superabsorbent polymer beads are tuned to have an average pore diameter of between 0.15 to 0.3 m.

23. The method of claim 9, wherein at least one of:
the porous superabsorbent polymer beads have a PEG content of between 2.5 wt % and 20 wt %; or
the porous superabsorbent polymer beads are tuned to have an average pore diameter of between 0.15 to 0.3 μm.

24. The method of claim 17, wherein the porous superabsorbent polymer beads are further tuned to avoid microbial contamination.

25. The method of claim 17, wherein the porous superabsorbent polymer beads are further tuned to enable successful testing of the stored first analytical target 1 day after introducing the sample to the porous superabsorbent polymer beads.

26. The method of claim 17, wherein the porous superabsorbent polymer beads are further tuned to enable successful testing of the stored first analytical target 7 days after introducing the sample to the porous superabsorbent polymer beads.

27. The method of claim 1, wherein:
the introducing comprises storing at least a portion of the carrier and the first target in the storage media;
the storage media has a swelling capacity profile configured to absorb and capture the first target and the carrier;
the first target has a size less than the capture size; and
the method further comprises removing unstored specimen from proximity of the storage media.

28. The method of claim 27, wherein:
the storage media comprises porous superabsorbent polymer beads; and
the porous superabsorbent polymer beads are tuned in order to at least one of:
enable storage at room temperature of the stored first target in the porous superabsorbent polymer beads;
avoid microbial contamination; or
enable testing of the stored first target.

\* \* \* \* \*